United States Patent
Ishida et al.

[11] Patent Number: 6,057,976
[45] Date of Patent: May 2, 2000

[54] APPARATUS FOR DETECTING ROTATIONAL DISPLACEMENT INFORMATION OF A ROTATING OBJECT

[75] Inventors: Yasuhiko Ishida, Tokyo; Naoki Kawamata, Utsunomiya, both of Japan

[73] Assignee: Canon Kabushiki Kaisha, Tokyo, Japan

[21] Appl. No.: 08/925,613

[22] Filed: Sep. 9, 1997

Related U.S. Application Data

[63] Continuation of application No. 08/428,515, Apr. 25, 1995, abandoned.

[30] Foreign Application Priority Data

| Apr. 28, 1994 | [JP] | Japan | 6-113896 |
| Apr. 29, 1994 | [JP] | Japan | 6-113614 |
| Apr. 18, 1995 | [JP] | Japan | 7-116505 |

[51] Int. Cl.[7] ................................. G11B 5/596
[52] U.S. Cl. ........................ 360/77.03; 360/78.11; 360/73.03; 360/75; 369/54; 356/138; 356/27; 318/640; 250/231.17
[58] Field of Search ................. 360/77.03, 78.11, 360/65, 73.03, 135, 75; 369/47, 54, 50, 284; 356/138, 27, 28, 28.5; 318/640; 250/231.17

[56] References Cited

U.S. PATENT DOCUMENTS

| 3,426,337 | 2/1969 | Black | 360/77.03 |
| 4,165,495 | 8/1979 | Takahashi | 360/65 |
| 4,558,383 | 12/1985 | Johnson | 360/77.03 |
| 4,613,916 | 9/1986 | Johnson | 360/78.11 |

FOREIGN PATENT DOCUMENTS

| 303852 | 11/1993 | Japan | 360/75 |

*Primary Examiner*—Alan Faber
*Attorney, Agent, or Firm*—Fitzpatrick, Cella, Harper & Scinto

[57] ABSTRACT

An angular division apparatus for circumferentially dividing a rotating object into a plurality of areas by using Doppler pulses includes an optical head for applying a beam emitted from a light source unit to a rotating object and detecting Doppler pulses based on a shift of the frequency of the light scattered from the rotating object, and a counting unit for counting the Doppler pulses output from the optical head to determine the number of pulses for one revolution of the rotating object. The number of Doppler pulses for one revolution is divided by a division number for dividing the rotating object into a plurality of areas in the angular direction. The rotating object is divided into a plurality of areas in the angular direction thereof by using the number of Doppler pulses per divided area.

21 Claims, 17 Drawing Sheets

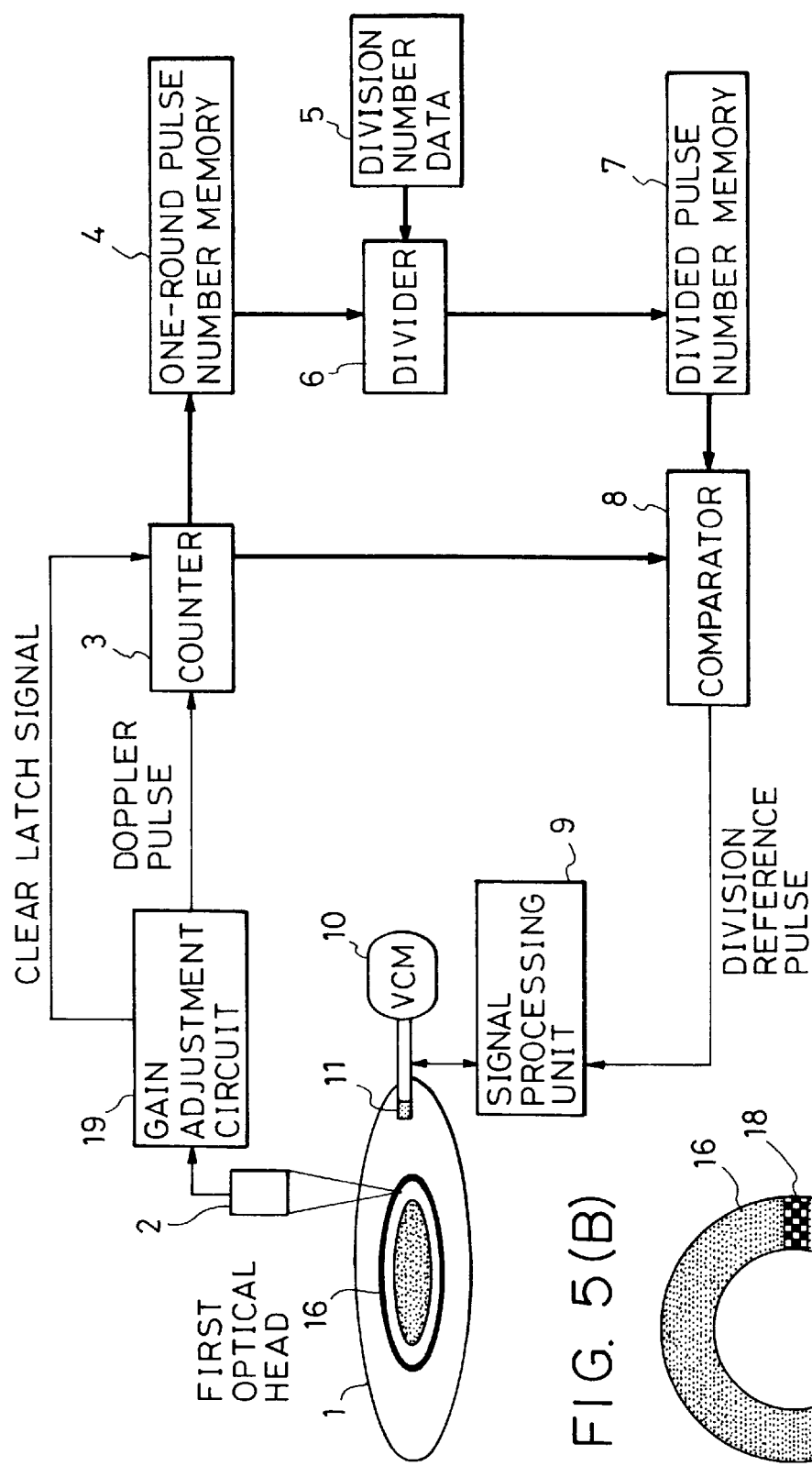
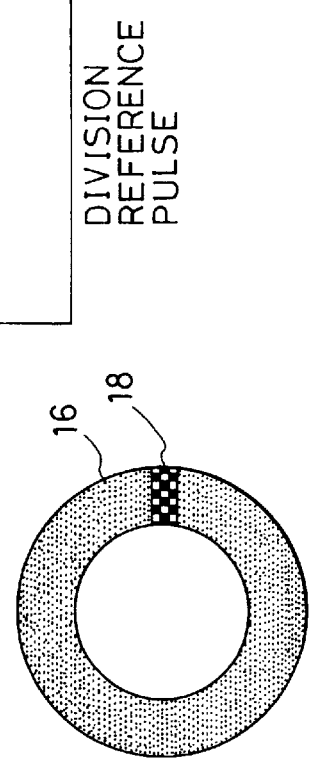
FIG. 5(A)
FIG. 5(B)

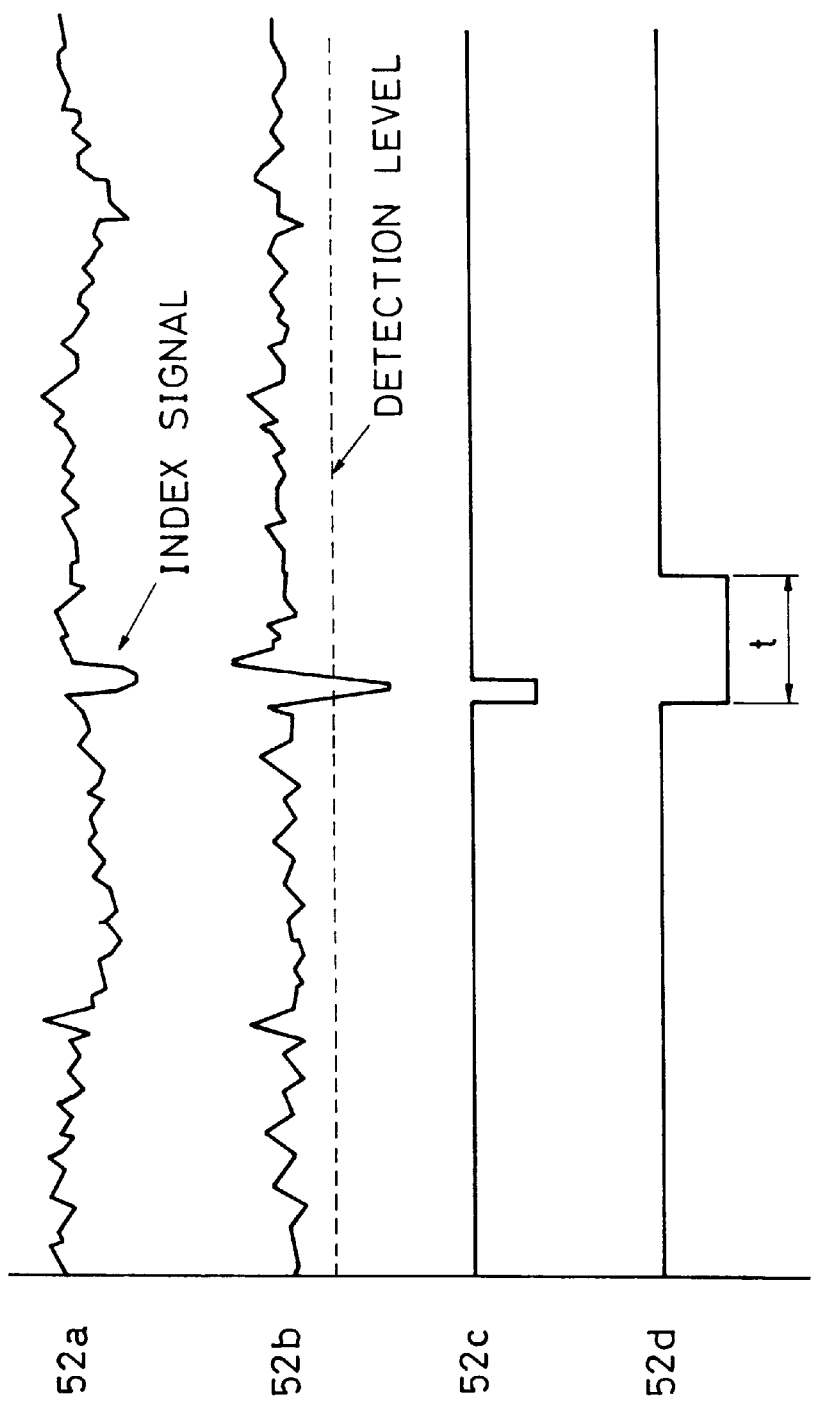

MOVING DIRECTION OF MEASUREMENT OBJECT

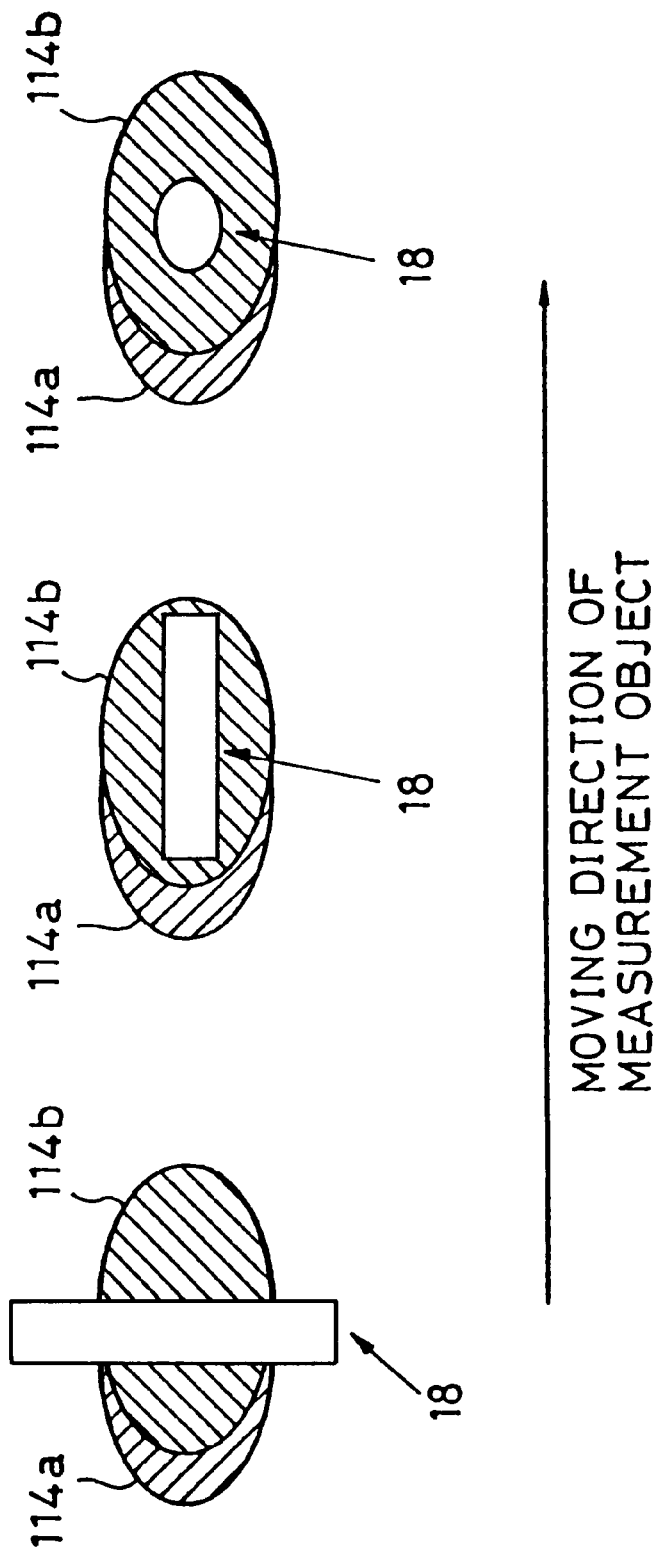

APPARATUS FOR DETECTING ROTATIONAL DISPLACEMENT INFORMATION OF A ROTATING OBJECT

This application is a continuation of application Ser. No. 08/428,515, filed Apr. 25, 1995, now abandoned.

BACKGROUND OF THE INVENTION

1. Field of the Invention

The present invention relates to an apparatus for detecting displacement information.

2. Description of the Related Art

A disk coated with a magnetic material is generally used as memory reproducing means for use with information processing apparatus, such as computers and the like. When signals (information) are magnetically written on the disk by a magnetic head, information for positioning the magnetic head must be previously written on the disk. Thus, pulses with a high frequency are first recorded in an unused area, mainly in the outermost periphery, of the disk by using an exclusive clock head separate from the head for writing information. Various angle division apparatus have been previously proposed in which the area on a disk is circumferentially divided into a plurality of portions on the basis of the pulses.

FIG. 1A is a schematic drawing illustrating a state where a disk is divided into a plurality of areas in the circumferential direction (angular direction). In FIG. 1A, reference numeral 1 denotes a disk to be divided. The drawing shows the state where the area on the disk 1 is divided into N equal areas. A portion between points a and b indicates one divided area on the disk. Although it is not always necessary to divide the disk at equal intervals, it is generally required to accurately divide a space of the disk at equal intervals, i.e., accurately divide the angle thereof.

Signals (information) are written on concentric tracks on the disk in each area. Positioning is thus performed by reading the positioning information (servo pattern) written at the top of each area. It is thus required to accurately divide the disk into areas without deviations between the respective concentric circles.

FIG. 1B is a schematic drawing showing a principal portion of a conventional angle division apparatus. In FIG. 1B, reference numeral 1 denotes a disk which is rotated by a spindle motor (not shown). Reference numeral 12 denotes a clock head for writing clock pulses with accurate time in an unused area of the disk 1 and reading the clock pulses therefrom. Reference numeral 1d denotes a clock pulse signal, and reference numeral 3 denotes a counter for counting the pulses generated from the clock head 12. Reference numeral 4 denotes a one-round pulse number memory for storing the number of pulses for one round of the disk 1. Reference numeral 5 denotes division number data indicating the number of divided areas for one revolution of the disk 1.

Reference numeral 6 denotes a divider for dividing the content of the one-round (one-revolution) pulse number memory 4 by the division number N of the division data 5 to determine the number of pulses per divided area. Reference numeral 7 denotes a divided pulse number memory for storing the number of pulses per divided area. Reference numeral 8 denotes a comparator for comparing the divided pulse number with the counter value to output division reference pulses for the divided areas.

Reference numeral 9 denotes a signal processing unit for writing and reading data through the magnetic head 11. Reference numeral 10 denotes a voice coil motor (referred to as "VCM" hereinafter) for driving the magnetic head 11 in the circumferential direction of the disk 1. The magnetic head 11 writes and reads data. In FIG. 1B, a fine line shows a pulse signal, and a thick line shows a data bus.

In FIG. 1B, the clock pulses with accurate time generated from a clock pulse circuit (not shown) are written, by the clock head 12, in an unused area of the disk 1 rotated by the spindle motor. The number of clock pulses for one revolution is previously determined, and the clock pulses are written while changing the frequency of the clock pulses until a correct number of pulses are written in.

The clock head 12 reads the written clock pulses, and the number of the clock pulses counted by the counter 3 is stored in the one-round pulse number memory 4. This value is divided by the division number of the division number data 5 and stored as the number of pulses per divided area in the divided pulse number memory 7.

The number of the pulses counted by the counter 3 is compared with the number of pulses per area by the comparator 8. The comparator 8 counts the pulses for one area and transmits as a reference pulse the number of pulses to the signal processing unit 9. At the same time, the comparator 8 sends a clear pulse to the counter 3 for making preparation for counting pulses from zero in a next area.

When receiving the division reference pulses, the signal processing unit 9 writes a signal for dividing the area on the disk 1 by using the magnetic head 11. The VCM 10 successively positions the magnetic head 11 at the predetermined intervals in the circumferential direction by a circumferential positioning device (not shown) to radially form position signals as division references on a concentric circle at equal angles by the magnetic head 11.

In the angle division apparatus shown in FIG. 1B, since the clock pulses are based on time, variations in the rotational speed affect directly the precision of angle division. In some cases, only during writing of the clock pulses, the rotational speed of the disk 1 is lowered for increasing the resolution by decreasing the effects of the variations in the rotational speed. This is the cause of interference with an increase in throughput. There is also the problem that defective products occur due to contact between the clock head and the disk.

Aside from the above angle division apparatus, a laser Doppler speedometer is conventionally used as an apparatus for precisely measuring the movement speed of a moving object without contact therewith. The laser Doppler speedometer applies a laser beam to the moving object and measures the moving speed thereof by employing the effect (Doppler effect) that the frequency of the light scattered from the moving object is shifted in proportion to the moving speed of the moving object, i.e, by detecting the Doppler signal.

The reference signal at the start position of measurement is sometimes used for detecting the information regarding movement of the moving object. In this case, an optical detector for detecting the Doppler signal and an optical detector for obtaining an index signal as a reference for the start position of measurement are provided.

In a conventional apparatus, the optical detector for detecting the Doppler signal and the optical detector for detecting the index signal are provided separately. There is thus the tendency that when the two optical detectors are provided opposite to the moving object, if the moving object is small, the whole apparatus is complicated.

SUMMARY OF THE INVENTION

A first object of the present invention is to provide an apparatus which is capable of circumferentially detecting angles of a disk or the like with high precision or dividing the disk into a plurality of areas with high precision, and a rotating object which enables the high-precision angle detection or the high-precision division.

A second object of the present invention is to provide an apparatus which is capable of obtaining a Doppler signal and an index signal by a simple configuration and detecting information about the movement of a moving object with high precision.

Other objects of the invention will be made apparent from the description of the preferred embodiments below.

BRIEF DESCRIPTION OF THE DRAWINGS

FIG. 5(A) is a block diagram illustrating a principal portion of a fourth embodiment and FIG. 5(B) shows a detection ring used in the fourth embodiment of the present invention;

FIG. 8 is a drawing illustrating an index signal detection method in accordance with the sixth embodiment;

FIGS. 12(A) through 12(C) are drawings illustrating the relation between an index mark and a beam spot in accordance with the seventh embodiment;

DETAILED DESCRIPTION OF THE PREFERRED EMBODIMENTS

Figure 2:
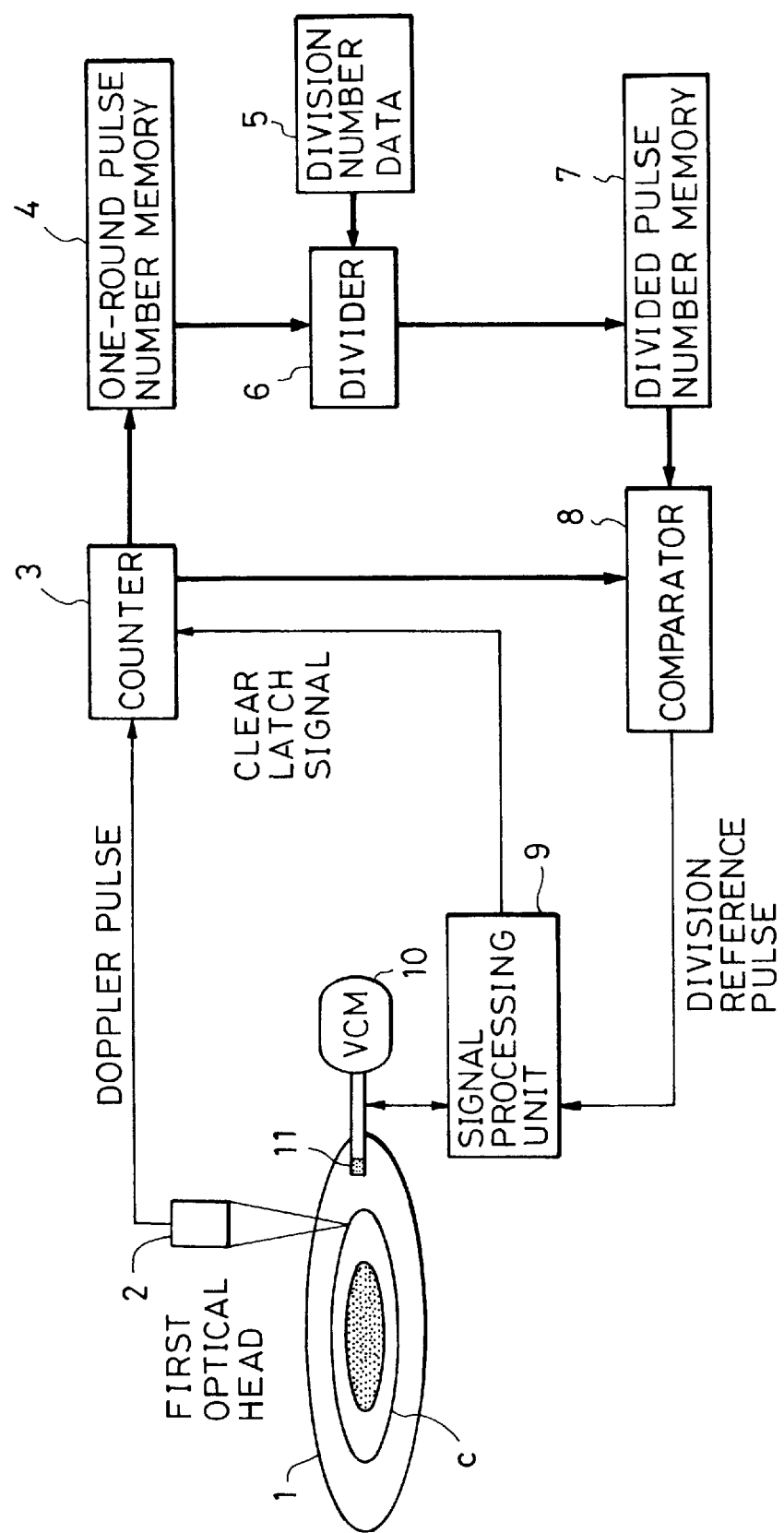
FIG. 2 is a block diagram illustrating a principal portion of a first embodiment of the present invention.

FIG. 2 is a block diagram illustrating a principal portion of a first embodiment of the present invention. In this embodiment, the present invention is applied to a servo track writer for a hard disk.

In FIG. 2, reference numeral 1 denotes a disk which is rotated by a spindle motor (not shown). Reference numeral 2 denotes an optical head which applies a laser beam to the disk 1 and detects the diffused light reflected from the disk 1 to generate Doppler pulses based on the rotational speed of the disk 1. Reference numeral 3 denotes counter means (e.g., a counter) for counting the Doppler pulses detected by the optical head 2. Reference numeral 4 denotes a memory for storing the number of pulses for one revolution of the disk 1.

Reference numeral 5 denotes division number data which indicate the number of areas into which one revolution of the disk 1 is divided. Reference numeral 6 denotes a divider for dividing the content of the memory 4 by the division number N of the division number data 5 to determine the number of pulses per divided area. Reference numeral 7 denotes a memory for storing the number of pulses per divided area (divided pulse number) therein. Reference numeral 8 denotes a comparator for comparing the divided pulse number with the value of the counter 3 to output division reference pulses for the divided areas. Reference numeral 9 denotes a signal processing unit for writing and reading data through the magnetic head 11.

Reference numeral 10 denotes a voice coil motor (VCM) for driving the magnetic head 11 in the circumferential direction of the disk 1. The magnetic head 11 writes and reads data. In FIG. 2, a thin line shows a pulse signal, and a thick line shows a data bus.

The Doppler pulses obtained by the optical head 2 have a frequency which is proportional to the speed (rotational speed) of an object (disk) irradiated with the laser beam. The Doppler pulses are counted to determine angular information.

When the optical head 2 is fixed, a circumference C on the disk 1 is a measurement object, and the length of one revolution of the disk 1 is constant even if the rotation of the spindle motor is off-centered. The number of the clock pulses corresponding to this circumference is thus constant regardless of variations in the rotational speed. In the present invention, since the clock pulses are finally written in the operation state, the problem of eccentricity is substantially removed.

A rotational reference signal for rotation is necessary for counting the clock pulses for one revolution of the disk 1. As means for obtaining the reference signal, the magnetic head 11 is fixed at a predetermined circumferential position by the VCM 10 for writing the reference signal. The reference signal is then read by the magnetic head 11, and a clear latch signal is generated for counting pulses between the respective reference signals by the counter 3.

The pulse number generated from the counter 3 is stored in the one-round (one-revolution) pulse number memory 4. This value is divided by the division number data 5 by the divider 6, and the result is stored as the pulse number per divided area in the divided pulse number memory 7. When the pulse number per divided area is not an integer, the pulse number is adjusted to be an integer within the range of one pulse.

For example, if an integer obtained by omitting figures below the decimal point is n, and the following equation is established:

$$m = \text{one-revolution pulse number} - (n \times N),$$

(N−m) areas of n pulses, and m areas of (n+1) pulses are formed.

For example, if the one-revolution pulse number is 3003, and the division number N=30, 3003÷30=100.1.

Therefore, n=100, and from the above calculation equation, m=3003−(100×30)=3. As a result, the disk is divided into 30 areas including 3 areas of 101 pulses and 27 areas of 100 pulses. The divided pulse number memory 7 thus has the form of a table showing the division number and the corresponding pulse number.

Although this embodiment employs the method of using the Doppler pulses directly, if required, the number of pulses may be further increased by electrical or signal processing means and used by the same method as conventional clock pulses.

The number of the pulses counted by the counter 3 is compared with the pulse number per divided area by the comparator 8. The comparator 8 transmits the division reference pulse to the signal processing unit 9 when the pulses for one area are completely counted. At the same time, the comparator 8 transmits the clear latch signal to the counter 3 for making preparations for counting pulses from zero in a next area.

When receiving the division reference pulses, the signal processing unit 9 writes a signal for dividing the area on the disk 1 through the magnetic head 11. The VCM 10 successively positions at predetermined intervals in the circumferential direction by a circumferential positioning device (not shown) to radially form position signals as division references at equal angles on a concentric circle on the disk 1.

Although, in FIG. 2, the optical head 2 is perpendicular to the disk 1, the optical head 2 need not be perpendicular to the disk 1 as long as the Doppler pulses can be obtained, and the optical head 2 may be positioned horizontally or obliquely with respect to the rotational axis of the disk 1. Reflection ring area C on the disk 1 where diffuse reflection takes place is previously formed on the disk 1 or formed by later attaching it thereto.

Figure 3A:
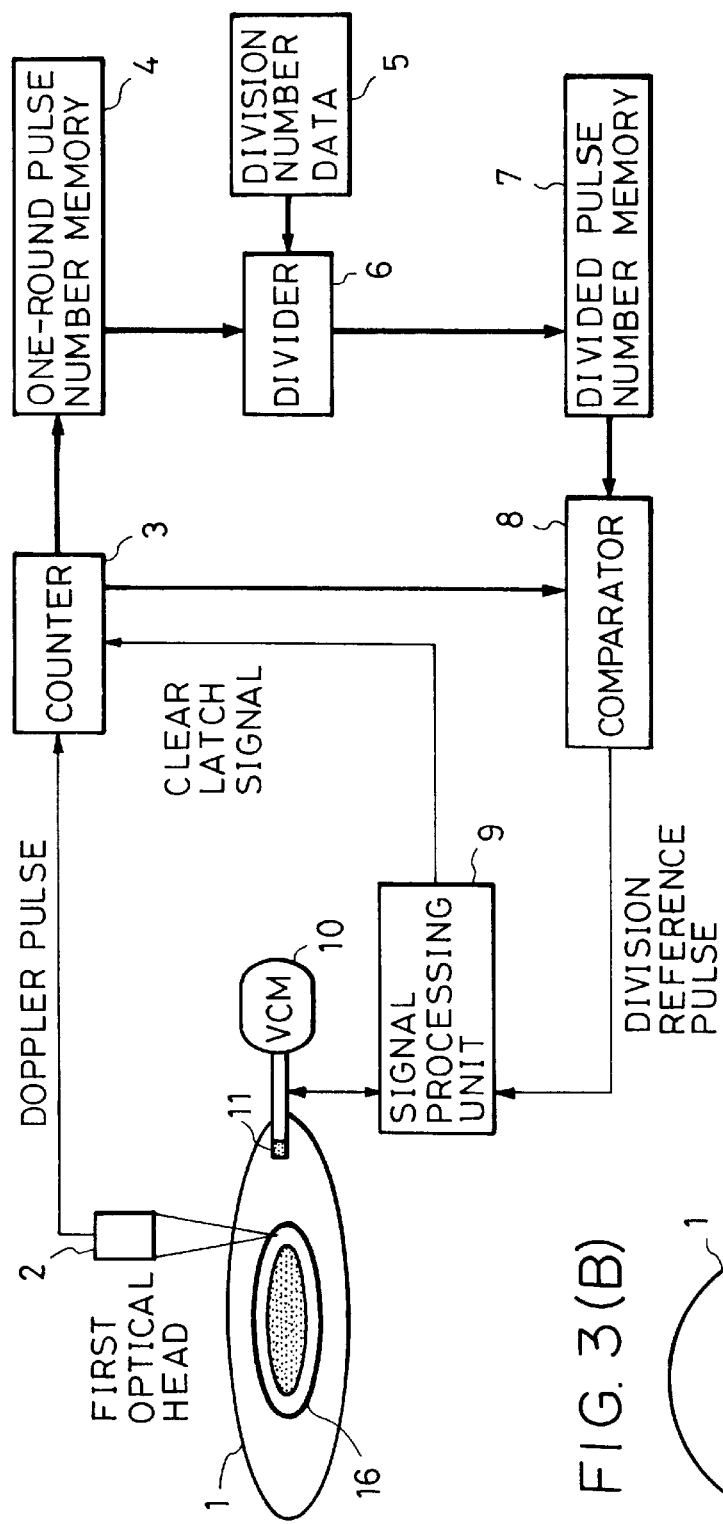
FIG. 3(A) is a block diagram illustrating a principal portion of a second embodiment and FIG. 3(B) shows a detection ring used in the second embodiment of the present invention.
Figure 3B:
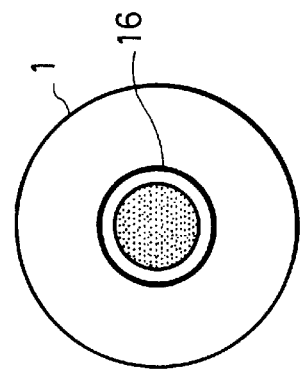

FIG. 3 is a block diagram illustrating a principal portion of a second embodiment of the present invention. In this embodiment, the present invention is applied to a servo track writer of a hard disk, as in the first embodiment. In FIG. 3, the same elements as those shown in FIG. 2 are respectively denoted by the same reference numerals.

The surface of the hard disk is sometimes finished into a mirror. In this case, Doppler pulses are not obtained from the surface of the hard disk. In this embodiment, therefore, a Doppler pulse detection ring 16 is attached to a portion other than the recording area on the disk 1. Alternatively, a Doppler pulse reflection area may be previously formed during the production of the hard disk and used in place of the detection ring 16.

This embodiment is the same as the first embodiment except that diffuse reflection is received from the detection ring 16. The detection ring 16 may be attached to any position as long as the Doppler pulses can be obtained from a laser beam, and a portion irradiated with the laser beam can be covered.

Figures 4A, 4B:
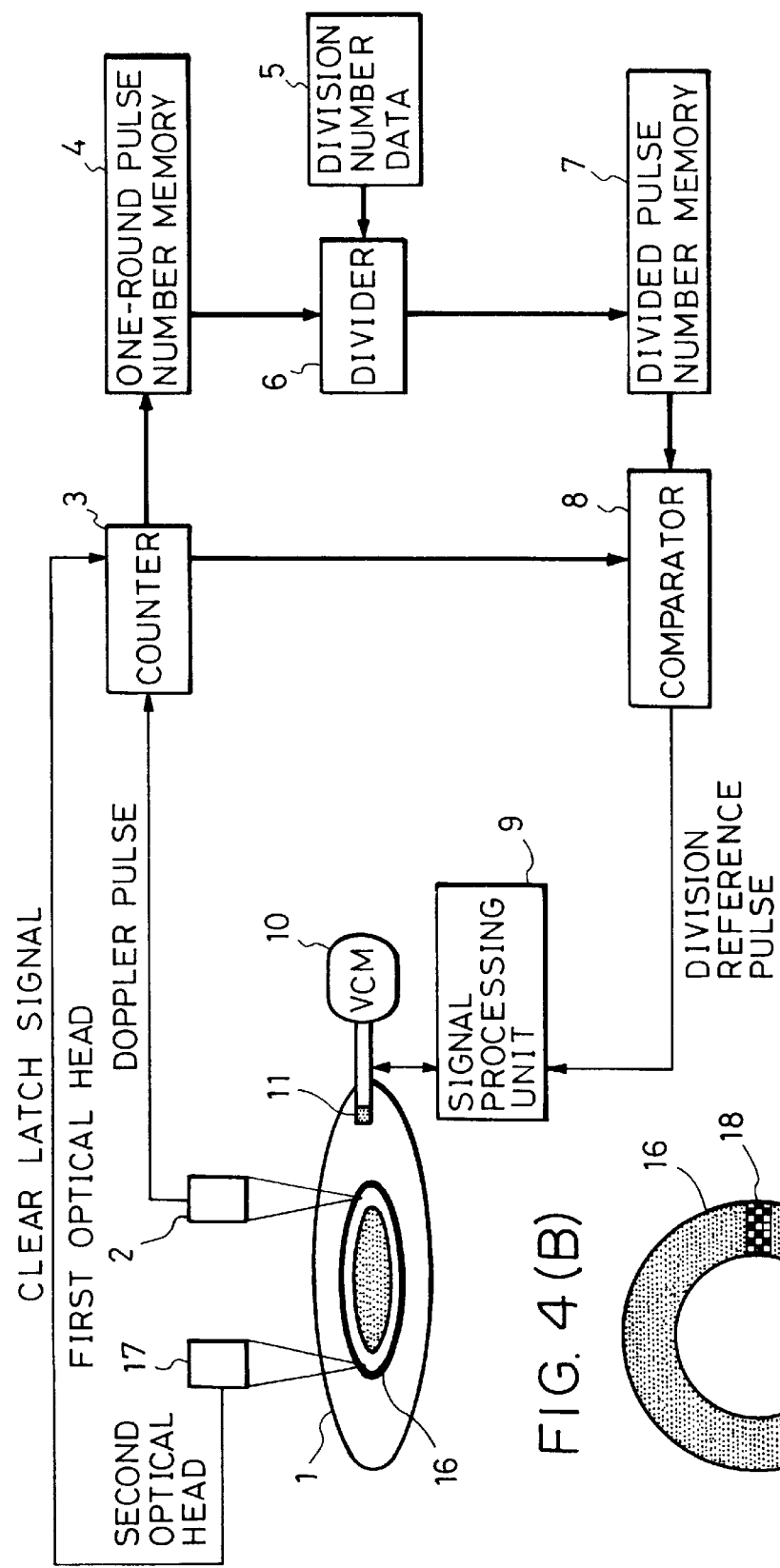
FIG. 4(A) is a block diagram illustrating a principal portion of a third embodiment and FIG. 4(B) shows a detection ring used in the third embodiment of the present invention.

FIG. 4 is a block diagram illustrating a principal portion of a third embodiment of the present invention. In this embodiment, the present invention is applied to a servo track writer of a hard disk, as in the first and second embodiments. In FIG. 4, the same elements as those shown in FIG. 2 are respectively denoted by the same reference numerals.

As described above in the first embodiment, in this system, a signal as a rotation reference for the disk 1 is necessary once for every revolution. In the first and second embodiments, the method of detecting the reference position signals by the magnetic head 11 causes the problem that if the magnetic head 11 is moved during servo track writing, the reference position signal cannot be detected. If the detection of the Doppler pulse is omitted (drop out), therefore, the sector positions are gradually shifted in some cases. It is preferable for accurately positioning the sectors that the rotation reference signals can be detected regardless of the position of the magnetic head 11.

In this embodiment, thus, a rotation reference area 18 is provided on the detection ring 16. The rotation reference area 18 has no effect on the output from a first optical head 2 which receives a laser beam. On the other hand, a second optical head 17 for detecting the rotation reference area 18 is provided so that the output from the second optical head 17 is input as a rotation reference signal (clear latch signal) to the counter 3.

In this embodiment, the reference position signal (clear latch signal) can be obtained regardless of the position of the magnetic head 11, and division is started from the reference position signal each time of positioning of the magnetic head 11. When the timing of the output from the comparator 8 with respect to the final divided area N is shifted from the timing of the rotation reference signal for each revolution, it is decided that division fails, and division is made again after erasure, without the magnetic head 11 being moved to a next track.

Although this embodiment relates to a method of attaching the detection ring 16 including the rotation reference area 18, a detection ring portion including the rotation reference area 18 may previously be formed. Alternatively, only the detection ring 16 may previously be formed, and the rotation reference area 18 may be later attached thereto.

FIG. 5 is a block diagram illustrating a principal portion of a fourth embodiment of the present invention. In this embodiment, the present invention is applied to a servo track writer of a hard disk, as in the above embodiments. In FIG. 5, the same elements as those shown in FIG. 2 are respectively denoted by the same reference numerals.

Although the above third embodiment uses the second optical head for detecting the rotation reference area 18, the fourth embodiment uses a gain adjustment circuit 19 for detecting a change in reflectance when the rotation reference area 18 is scanned so as to detect the rotation reference area 18. Thus, the gain adjustment circuit 19 is previously provided on the first optical head 2 so as to correct a change in the quantity of light due to a change in reflectance.

As a result, the correct Doppler pulses can be obtained even if the quantity of light changes. Since each of the first three embodiments uses the Doppler pulses which are adjusted in gain, the gain adjustment circuit is not shown in the drawings. However, in this embodiment, the rotation reference area 18 on the detection ring 16 is detected by the gain adjustment circuit 19 for detecting a change in the quantity of light. Since the detection ring 16 is formed so as to have uniform reflectance, the rotation reference area 18 can be detected by measuring the quantity of light. In this embodiment, the function possessed by the gain adjustment circuit is partly employed for realizing the same function as in the third embodiment without using the second optical head.

Although this embodiment relates to the method of attaching the detection ring including the rotation reference area 18, a detection ring portion including the rotation reference area 18 may be previously formed, or the rotation reference area 18 may be attached after forming only the detection ring 16.

Figure 6:
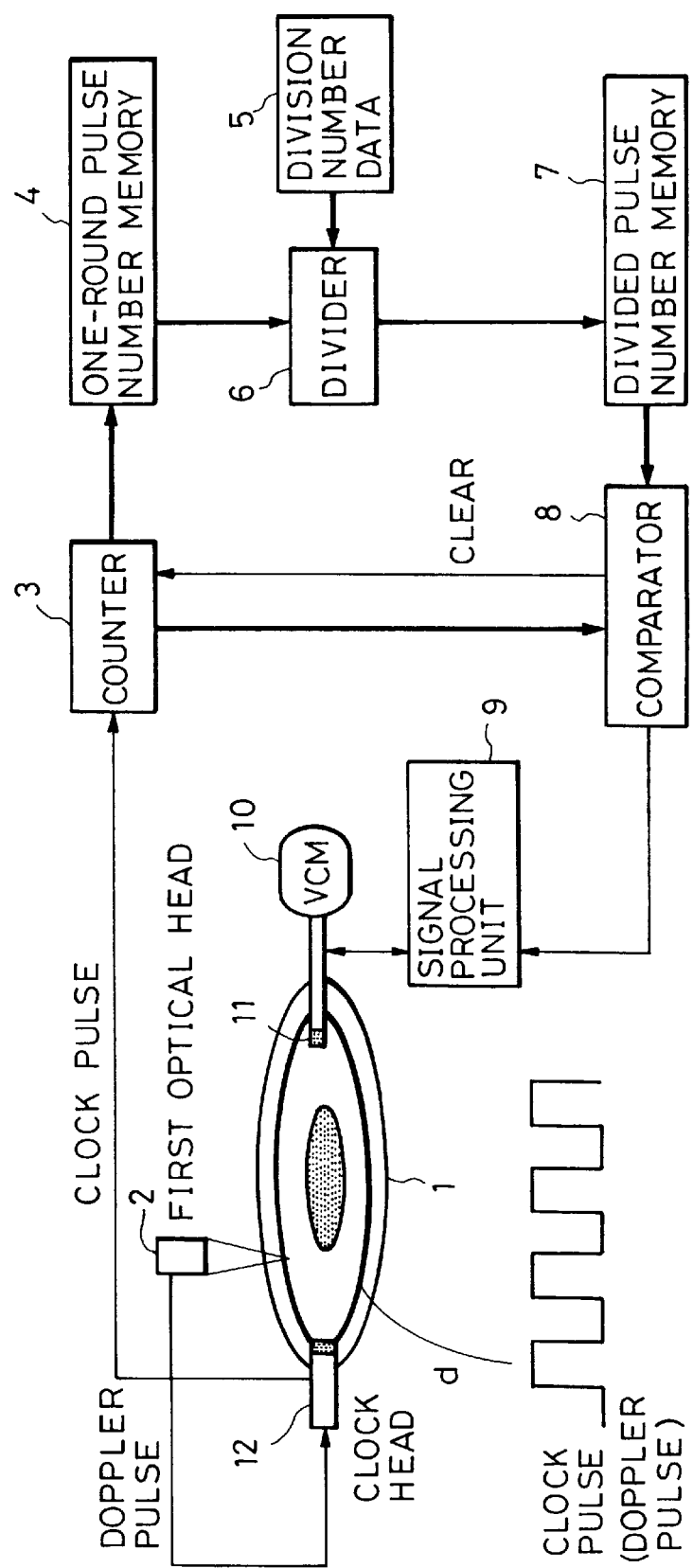
FIG. 6 is a block diagram illustrating a principal portion of a fifth embodiment of the present invention.

FIG. 6 is a block diagram illustrating a principal portion of a fifth embodiment of the present invention. In this embodiment, the present invention is applied to a servo track writer of a hard disk. In FIG. 6, the same elements as those shown in FIG. 2 are respectively denoted by the same reference numerals.

In this embodiment, the Doppler pulses obtained from the optical head 2 are input to the clock head 12 and recorded as a clock signal (clock pulse signal). Since the Doppler pulses are generated proportionally with position changes, the use of the Doppler pulses permits the clock pulses to be recorded without being affected by irregularity in rotation of the disk 1. Particularly, in this embodiment, the correct clock pulse signal for the space can be obtained, thereby facilitating writing of correct clock pulses proportional to the angle without influences of the irregularity in rotation of the disk 1.

In this embodiment, the clock pulses are written in an unused area on the disk 1, which is rotated by the spindle motor, by the clock head 12 using the Doppler pulses generated from the optical head 2. The clock head 12 reads the written clock pulses, and the counter 3 counts the read clock pulses and then stores the number of the pulses in the one-round pulse number memory 4. This value is divided by the division number of the division number data 5 by the divider 6, and the result is stored as the number of pulses per divided area in the divided pulse number memory 7. When the pulse number per divided area is not an integer, the pulse number is adjusted to be an integer within the range of 1 pulse.

For example, if the value obtained by omitting figures below the decimal point is n, and if the following equation is established:

$$m = \text{one-revolution pulse number} - (n \times N),$$

(N−m) areas of n pulses and m areas of (n+1) pulses are formed. Accordingly, the divided pulse number memory 7 has the form of a table showing the division numbers and the corresponding pulse numbers.

The number of the pulses counted by the counter 3 is compared with the number of pulses per divided area by the comparator 8. The comparator 8 counts the pulses per divided area, and transmits the pulse number as a reference pulse to the signal processing unit 9. At the same time, the comparator 8 transmits a clear pulse to the counter 3 for making preparations for counting pulses from zero in a next divided area. The comparator 8 also transmits an increment signal to the divided pulse number memory 7 for advancing the table and compares the number of pulses counted with the pulse number for a next divided area.

This embodiment is the same as the first embodiment except that diffused reflected light is received from the detection ring 16. The detection ring 16 may be attached to any position so long as the Doppler pulses can be obtained from a laser beam, and a portion irradiated with the laser beam can be covered.

When receiving the division reference pulse, the signal processing unit 9 writes a signal for dividing the area on the disk through the magnetic head 11. The VCM 10 successively positions the magnetic head 11 at predetermined intervals in the circumferential direction by a circumferential positioning device (not shown) to radially form position signals as division references at equal angles on a concentric circle of the disk 1.

The above-described embodiments enable non-contact, high-precision division of the angle without influences of changes in the rotational speed.

It is also possible to produce the division reference signals in a non-contact, high-precision manner using Doppler pulses regardless of changes in the rotational speed.

The provision of the reflecting ring area permits the Doppler pulses to be obtained regardless of the surface condition of a rotating body, and the rotation reference signal to be obtained for every rotation by detecting the scattered light from another reference position detection area for determining the pulse signals of the start and end of counting.

The provision of the reflecting ring area also permits the Doppler pulses to be obtained regardless of the surface condition of a rotating body, and the rotation reference signal to be obtained for every rotation by detecting the scattered light from the reference position detection area having a diffuse reflectance different from that of the reflecting ring area for determining the pulse signals of the start and end of counting.

The provision of the diffusion ring area permits the realization of a rotating body which can be divided in the angular direction by employing Doppler pulses, as described above.

Figure 7:
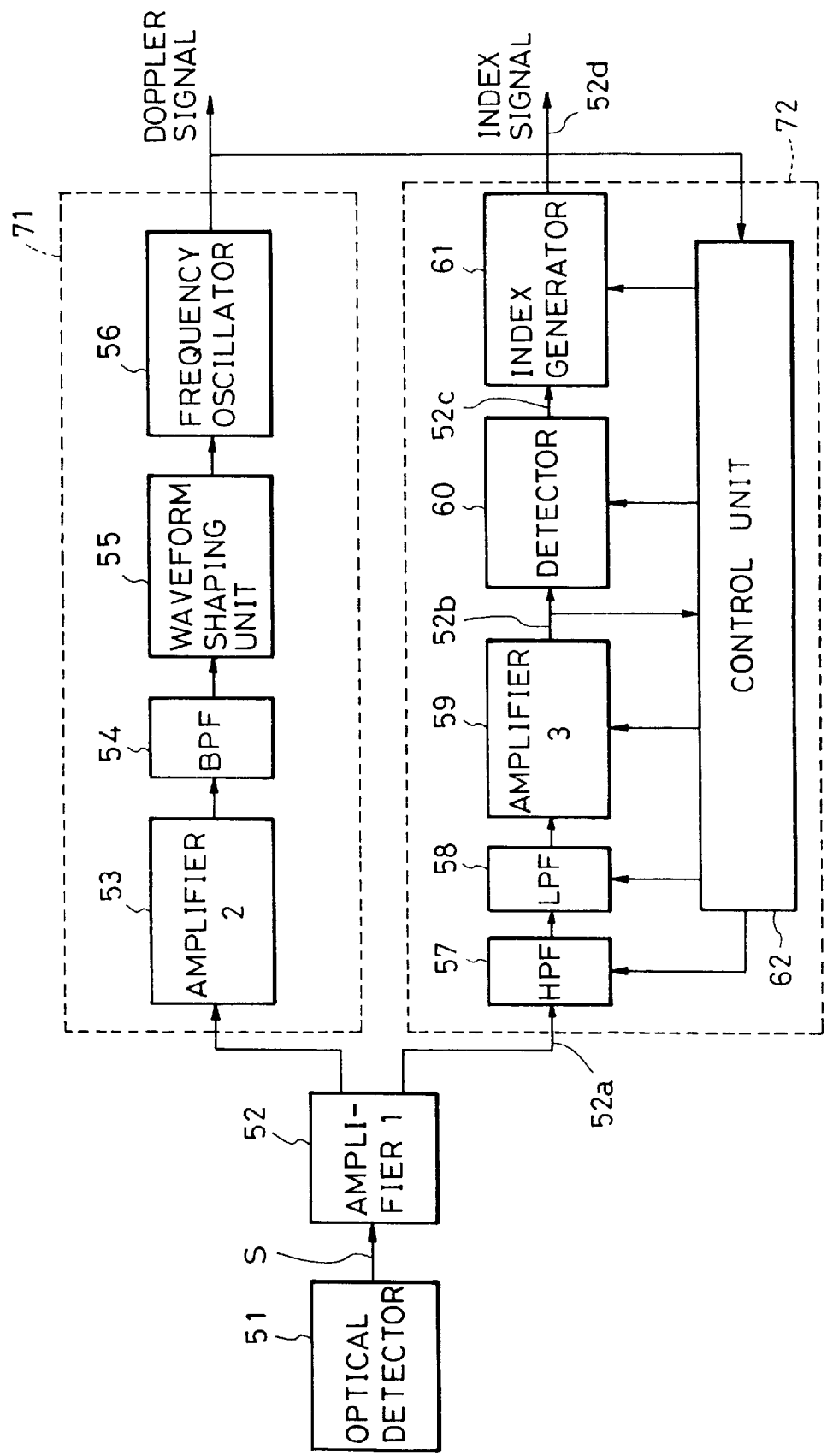
FIG. 7 is a block diagram illustrating a principal portion of a sixth embodiment of the present invention.

FIG. 7 is a block diagram illustrating a principal portion of a sixth embodiment of the present invention. This embodiment has a configuration for obtaining an index signal in a speedometer which employs the Doppler effect.

In FIG. 7, reference numeral 71 denotes a Doppler signal processing circuit, and reference numeral 72 denotes an index signal processing circuit. Reference numeral 51 denotes an optical detector for detecting both the light which is subjected to Doppler shift and scattered from a measurement object (moving object) irradiated with a beam for measuring the speed and the light scattered from an index mark to output the detected light as an output signal S. Reference numeral 52 denotes a first amplifier for amplifying the signal S output from the optical detector 51. The amplifier 52 outputs a signal including the Doppler signal and an index signal and corresponding to the quantity of diffused reflected light from the measurement object.

Reference numeral 53 denotes a second amplifier for amplifying the Doppler signal output from the first amplifier 52 to a constant level. Reference numeral 54 denotes a band pass filter for removing noise from the Doppler signal output from the second amplifier 53. Reference numeral 56 denotes a frequency oscillator for outputting as a continuous signal the binary Doppler signal output from a waveform shaping circuit 55.

In this embodiment, information regarding the movement of the moving object is detected by the binary Doppler signal (Doppler frequency F) output from the Doppler signal processing circuit 71 on the basis of an equation which will be described below.

Reference numeral 57 denotes a high-pass filter (HPF) for removing the variations in the signal caused by the surface properties of the measurement object from the signal corresponding to the quantity of diffused reflected light including the index signal output from the first amplifier 52. Reference numeral 58 denotes a low-pass filter for removing the Doppler signal and high-frequency noise from the signal output from the high-pass filter (HPF) 57. Reference numeral 59 denotes a third amplifier for amplifying the index signal output from the low-pass filter 58. Reference numeral 60 denotes a detector for detecting the index signal output from the third amplifier 59.

Reference numeral 61 denotes an index generator for outputting an index signal with a predetermined width on the basis of the index signal output from the detector 60. Reference numeral 62 denotes a control unit for controlling each of the elements 57 to 61. For example, the control unit 62 changes the cut-off frequencies of the high-pass filter 57, low-pass filter 58, etc. (band-pass filters) based on speed information of the moving object, which is obtained from the Doppler signal processing circuit 71, to obtain a predetermined index signal from the index generator 61.

Figures 9A, 9B, 9C:
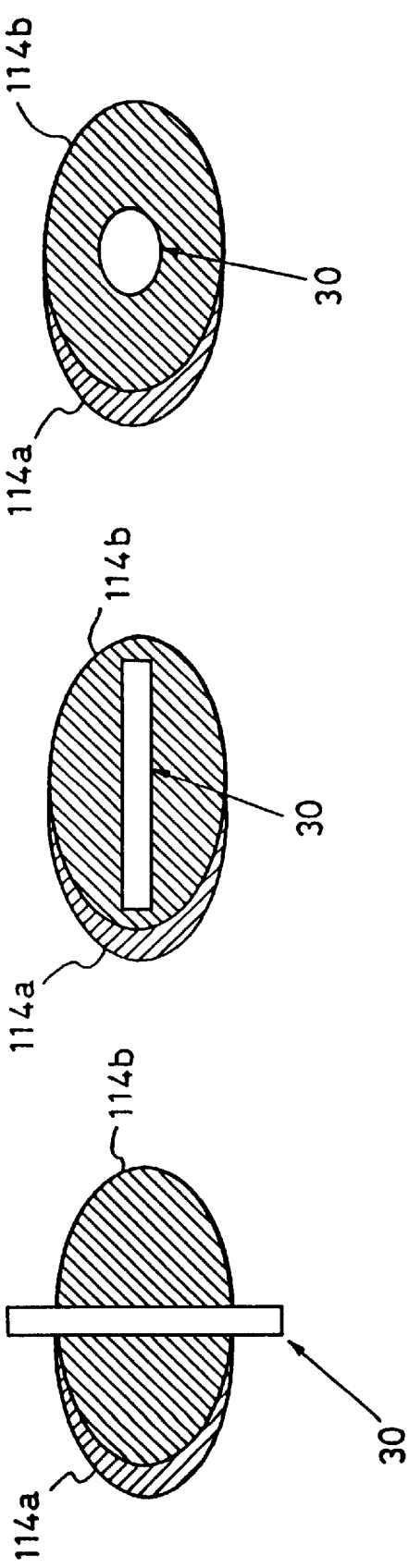
FIGS. 9(A) through 9(C) are drawings illustrating the relation between an index mark and a beam spot in accordance with the sixth embodiment.

FIGS. 9(A) through 9(C) are drawings illustrating the size of an index mark to be written on the measurement object when the index mark is formed on the measurement object by index forming means in this embodiment.

In these figures, reference numeral 30 denotes an index mark, and reference numerals 114a and 114b each denote a spot of a laser beam applied to the measurement object. The index mark 30 is smaller than the spots 114a and 114b of two beams of a laser beam Doppler speedometer, which cross each other.

FIG. 9(A) shows the index mark 30 which is long in the direction perpendicular to the moving direction, FIG. 9(B) shows the index mark 30 which is long in the moving direction, and FIG. 9(C) shows the round index mark 30. The index mark to be written has a different diffusion reflectance from that of the measurement object, i.e., lower or higher than that of the measurement object.

Description will be made of the method of detecting and generating the index signal in this embodiment. In FIG. 7, the signal output from the first amplifier 52, which includes the index signal and which corresponds to the quantity of diffused reflected light, contains low-frequency signal variations due to the change in the quantity of light caused by the surface properties of the measurement object, as shown by a signal waveform 52a in FIG. 8.

Therefore, the variations in the signal due to the surface properties of the measurement object are removed by the HPF 57, and high-frequency noise due to the Doppler signal is then removed by the LPF 58. The index signal is then efficiently amplified by the third amplifier 59 to obtain a signal as shown by a signal waveform 52b in FIG. 8.

As a result, the index signal detection level of the detector 60 for detecting the signal level can easily be set based on the level output from the third amplifier 9, thereby preventing operation error. The index generator 61 sets the output width t of the index signal detected by the detector 60 and outputs the index signal.

In this embodiment, speed information of the measurement object is detected based on the Doppler signal output from the frequency oscillator 56, and the cut-off frequencies of the HPF 57 and LPF 58 are determined by the control unit 62 based on the speed information. Thus, the index signal can be efficiently amplified by the amplifier 59. The cut-off frequencies can easily be determined because if the size of the index mark, the diameter of the laser beam, and the speed of the moving object are known, the width of the index signal shown by the waveform 52a in FIG. 8 can be calculated.

The index mark is smaller than the spots of two laser beams which cross each other, thereby preventing a decrease in measurement precision with substantially no influence on the level of the Doppler signal.

Figure 10:
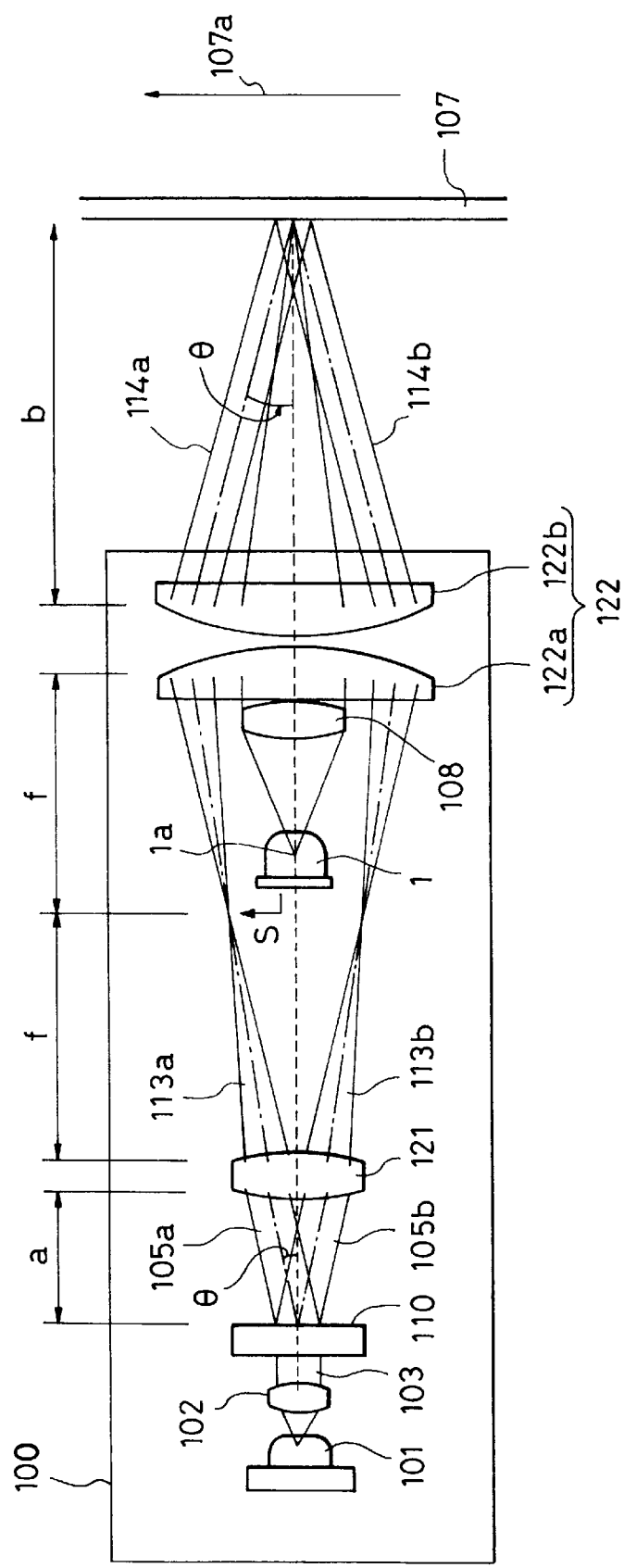
FIG. 10 is a schematic drawing illustrating a principal portion of an optical system of a speedometer in the sixth embodiment.

FIG. 10 is a schematic drawing illustrating a principal portion of a speedometer optical system in accordance with this embodiment.

In FIG. 10, reference numeral 100 denotes a speedometer using the Doppler effect; reference numeral 101, a laser diode; reference numeral 102, a collimator lens; reference numeral 107, a measurement object as a moving object; and reference numeral 110, a diffraction grating having a grating pitch A. Reference numerals 121 and 122 each denote a convex lens having a focal distance f, the convex lenses being arranged as shown in FIG. 10. Assuming that the distance between the diffraction grating and the lens 121 is a, and the distance between the lens 122 and the measurement object 107 is b, the distances a and b satisfy the following relation:

$$a+b=2f.$$

The laser beam emitted from the laser diode 101 having a wavelength $\lambda$ of about 0.68 $\mu$m is made into a parallel beam 103 having a diameter of 1.2 mm$\phi$ by the collimator lens 102, and then enters the transmission type diffraction grating 110 having a grating pitch d of 3.2 $\mu$m in the direction perpendicular to the grating arrangement. At this time, ±primary diffracted light beams 105a and 105b are emitted at a diffraction angle $\theta_1$=12°.

When the beams 105a and 105b enter the convex lens 121 having a focal distance f of 15 mm, such light beams 113a and 113b as shown in FIG. 10 are obtained. When the beams 113a and 113b enter the other convex lens 122 at a distance of 2f (=30 mm) from the convex lens 121, parallel light beams 114a and 114b are obtained again to irradiate a measurement object 107 moving at a speed V (mm/sec) with a spot diameter of 1.2 mm$\phi$ at the same diffraction angle as the angle $\theta_1$ of diffraction from the diffraction grating 110.

Figure 1A:
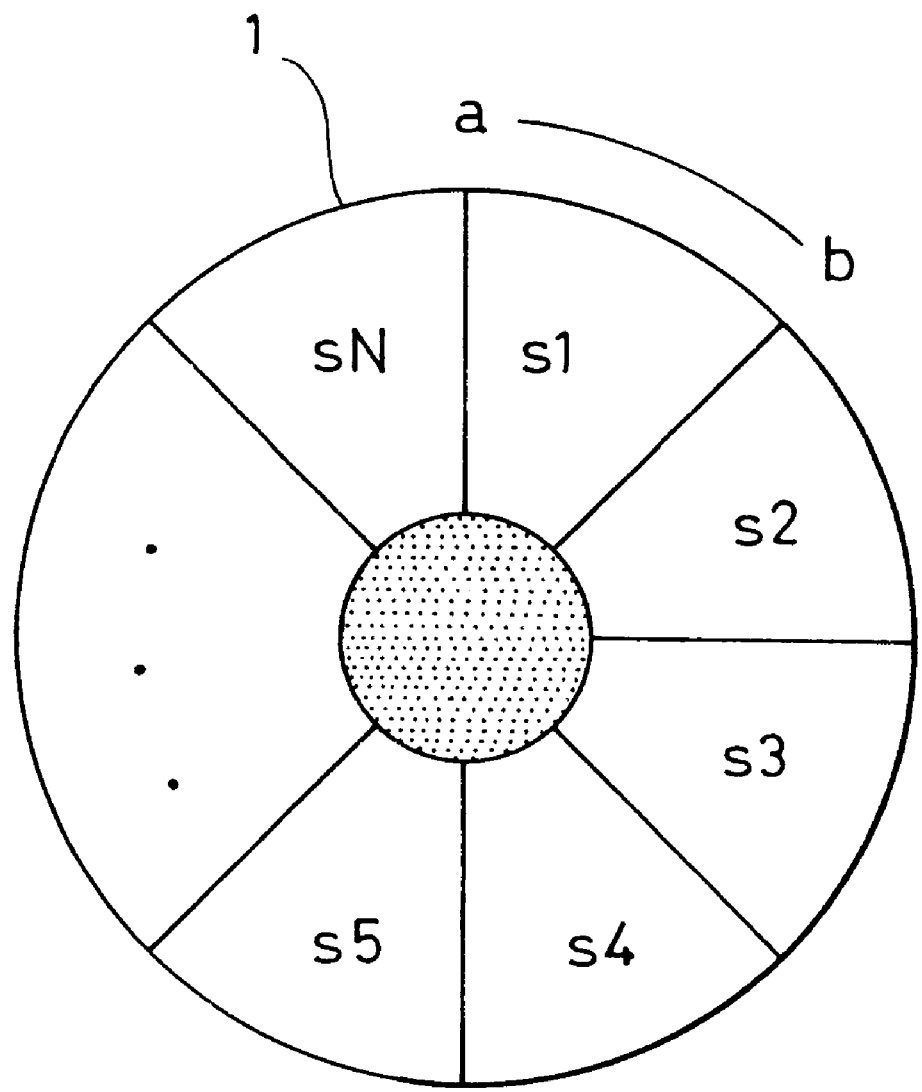
FIG. 1A is a drawing illustrating a state where a disk is circumferentially divided into a plurality of areas.
Figure 1B:
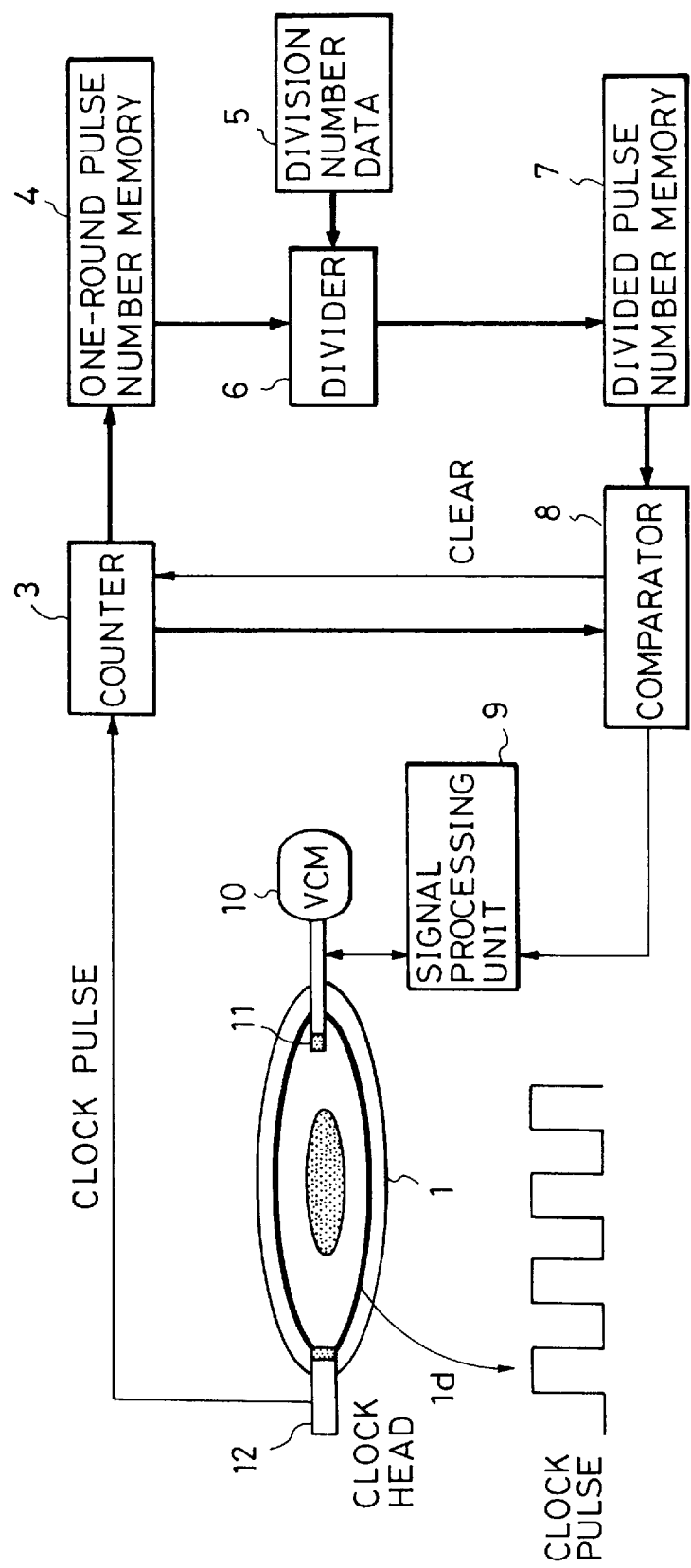
FIG. 1B is a block diagram illustrating a principal portion of a conventional angle division apparatus.

The light scattered from the measurement object 107 is efficiently condensed by the convex lens 122 and a condensing lens 108 and attached to a light receiving portion 1a of the optical detector 1 to detect an optical signal containing the Doppler signal represented by the equation (a1) below. Speed information of the moving object 107 can thus be obtained through computation means (not shown) which receives the output from the Doppler signal processing circuit configured as shown in FIG. 1.

$$F=2V/d=V/1.6 \text{ (kHz)} \tag{1a}$$

wherein a=10 mm and b=20 mm, b is made relatively long for increasing the working distance, thereby increasing the degree of freedom of the installation of the speedometer.

If the wavelength $\lambda$ of the laser beam emitted from the laser diode 101 is changed, although the diffraction angle $\theta$ is changed in accordance with dsin $\theta$=$\lambda$, the Doppler signal is not changed. In this apparatus, the positions of the two beam spots are also constant. Namely, the measurement object 107 is set as shown in FIG. 4, and the two beam spots are always maintained in an appropriate cross state so that the positions of the two beam spots on the measurement object 107 are constant, and no deviation occurs between the positions of the spots, thereby obtaining the good Doppler signal and index signal.

As described above, the light including the Doppler signal and index signal, which is scattered from the moving object, is detected by an optical detector for detecting the Doppler signal, and the signal output from the optical detector is processed by the signal processing circuit having an appropriate configuration to obtain both the Doppler signal and the index signal. This enables the achievement of a speedometer or an apparatus for detecting displacement information which is capable of detecting the movement information of a moving object with high precision by a simple construction.

Figure 11A:
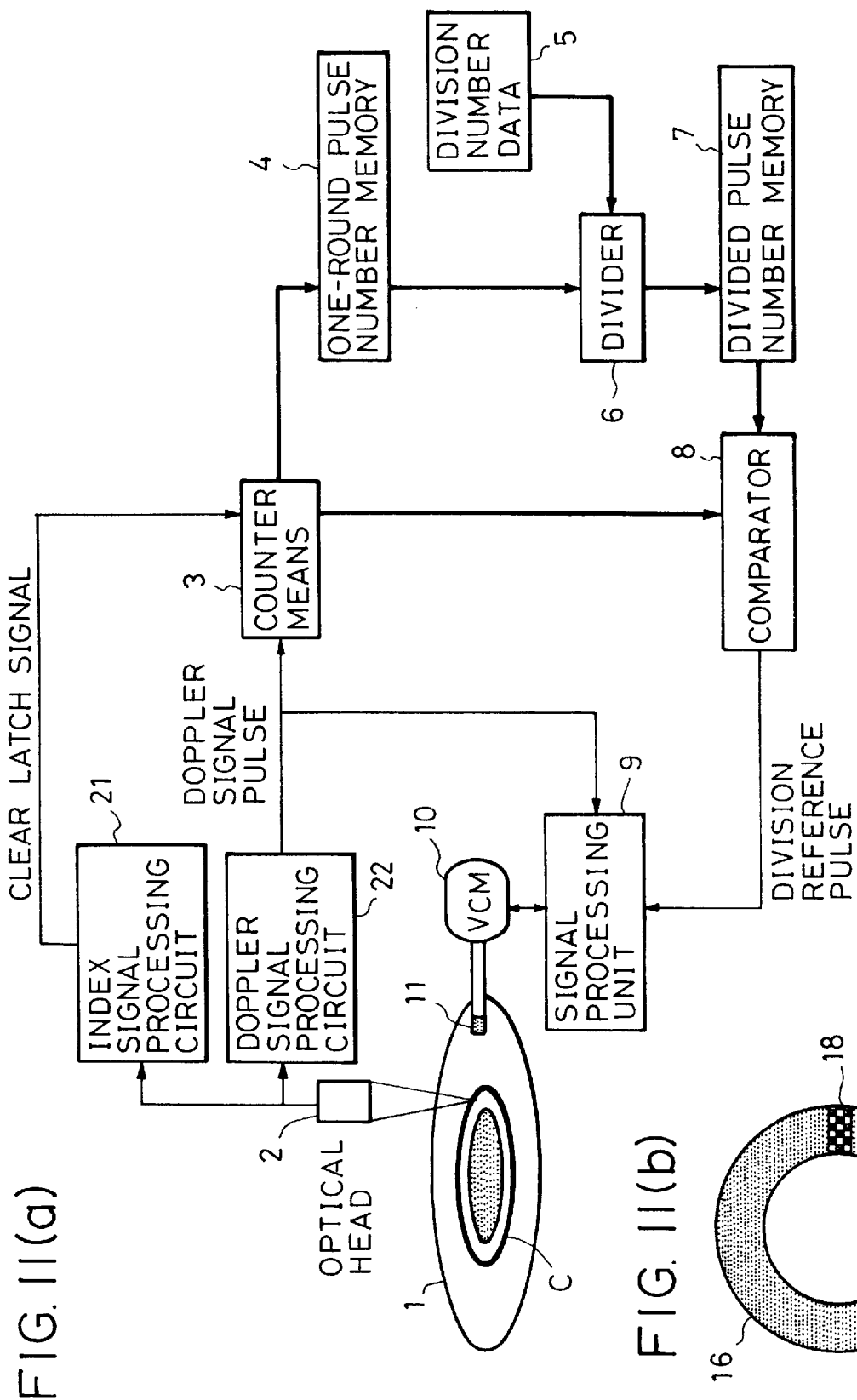
FIG. 11(A) is a block diagram illustrating a principal portion of a seventh embodiment and FIG. 11(B) shows a detection ring used in the seventh embodiment of the present invention.

FIG. 11(a) is a block diagram illustrating a principal portion of a seventh embodiment of the present invention. In this embodiment, the present invention is applied to a servo track writer of a hard disk. The same members as those described above are respectively denoted by the same reference numerals.

In FIG. 11(a), reference numeral 1 denotes a disk which is rotated by a spindle motor (not shown). Reference numeral 2 denotes an optical head which irradiates the disk 1 with a laser beam and which detects and amplifies the diffused light reflected from the disk 1 to output a signal including the Doppler signal and index signal based on the rotational speed of the disk 1. Reference numeral 3 denotes counter means for counting the Doppler signal pulses detected by the Doppler signal processing circuit 22. Reference numeral 4 denotes a one-round (one-revolution) pulse number memory for storing the number of pulses for one revolution of the disk 1.

Reference numeral 5 denotes division number data indicating the number of divided areas for one revolution of the disk 1. Reference numeral 6 denotes a divider for dividing the content of the one-round pulse number memory 4 by the division number (N) of the division number data 5 to determine the number of pulses per divided area. Reference numeral 7 denotes a divided pulse number memory for storing the number of pulses per divided area (divided pulse number). Reference numeral 8 denotes a comparator for comparing the divided pulse number with the value of the counter means 3 to output division reference pulses for the divided areas. Reference numeral 9 denotes a signal processing unit for writing and reading out data through the magnetic head 11.

Figure 11B:
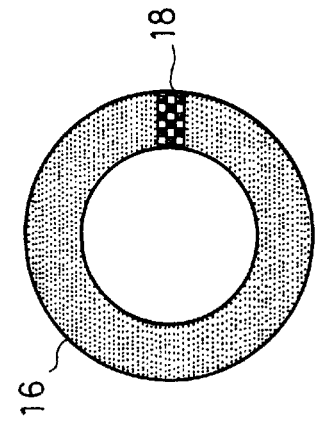

Reference numeral 10 denotes a voice coil motor (VCM) for driving the magnetic head 11 in the circumferential direction of the disk 1. The magnetic head 11 writes and reads out data. In FIG. 11(*a*), a thin line shows a pulse signal, and a thick line shows a data bus.

The Doppler signal pulses obtained from the Doppler signal processing circuit 22 based on detection by the optical head 2 have a frequency proportional to the speed (rotational speed) of the object (disk) irradiated with the laser beam. In this embodiment, the Doppler signal pulses are counted to determine angular information.

When the optical head 2 is fixed, the measurement object is a circumference C on the disk 1.

Even if the rotation of the spindle motor is off-centered, the length of one revolution is the same, and the number of Doppler signal pulses for one revolution is constant regardless of a change in the rotational speed. In addition, in the present invention, since positioning information is finally written in the operation state, no problem of eccentricity remains.

A rotation reference signal is necessary for counting the Doppler signal pulses for one revolution. As reference signal means, an index mark which has a diffusion reflectance different from that of the disk 1 and which is smaller than the incident beam is provided at a position on the circumference C. This index mark is detected by the optical head 2, and a clear latch signal is obtained as a reference signal from the index signal obtained from the index signal processing circuit 21. The pulses between the respective reference signals are counted by the counter means 3.

The number of the pulses counted by the counter means 3 is stored in the one-round pulse memory 4. This value is divided by the division number data 5 by the divider 6, and the result is stored as the number of pulses per divided area in the divided pulse number memory 7. When the pulse number per divided area is not an integer, the number is adjusted to be an integer within the range of one pulse.

If an integer obtained by omitting figures below the decimal point is n, and if the following equation is established:

$$m = \text{one-revolution pulse number} - (N \times N)$$

(N−m) areas of n pulses and m areas of (n+1) pulses are formed.

For example, when the one-revolution pulse number is 3003, and the division number N=30, n=100 according to the following equation:

$$3003 \div 30 = 100.1$$

m is calculated by the above calculation equation.

$$m = 3003 - (100 \times 30) = 3$$

As a result, the disk is divided into 30 areas including 3 areas of 101 pulses and 27 areas of 10 pulses. The divided pulse number memory 7 has the form of a table showing the division numbers and the corresponding pulse numbers.

Although this embodiment employs the method of directly using the Doppler signal pulses, if required, the number of pulses may be further increased or decreased by electrical or signal processing means and then processed by the same method as for conventional clock pulses.

The number of the pulses counted by the counter means 3 is compared with the pulse number per divided area by the comparator 8. When the pulses per divided area are counted, the comparator 8 transmits the division reference pulses to the signal processing unit 9. At the same time, the clear latch signal is transmitted to the counter means 3 to make preparation for counting pulses of a next area.

When receiving the division reference pulses, the signal processing unit 9 writes a signal for dividing the area on the disk 1 by the magnetic head 11. The VCM 10 successively positions the magnetic head 11 at predetermined circumferential intervals by a circumferential positioning device (not shown) to radially form positioning information at equal intervals on a concentric circle of the disk 1.

Although, in FIG. 11(*a*), the optical head 2 is perpendicular to the disk 1, the optical head 2 need not be perpendicular to the disk 1 as long as the Doppler signal pulses can be obtained, and the optical head 2 may be positioned horizontally or obliquely with respect to the rotation axis. In this embodiment, the reflection ring area C for diffusion and reflection on the disk 1 is previously formed on the disk 1 or formed by later attaching the ring area thereto.

The surface of the hard disk is sometimes finished into a mirror. In this case, the Doppler signal pulses cannot be easily obtained from the surface of the hard disk. In this embodiment, therefore, a Doppler pulse signal detection ring 16 corresponding to the circumference C is attached to a portion other than the recording area on the disk 1.

The detection ring 16 may be attached to any position so long as the Doppler pulses can be obtained from the laser beam, and a portion irradiated with the laser beam can be covered.

In this embodiment, an index mark 18 serving as a rotation reference is provided on the detection ring 16. The index mark 18 has no influence on the Doppler output from the optical head 2 receiving the laser beam. On the other hand, an index signal processing circuit 21 is provided for detecting the index mark 18 so that the output from the index signal processing circuit 21 is input as a rotation reference signal (clear latch signal) to the counter means 3.

In this embodiment, the reference position signal (clear latch signal) can be obtained from the optical head 2, and writing of the positioning information is started from the first divided area from the reference position signal of each time of positioning of the magnetic head 11. When the timing of the output from the comparator 8 with respect to the final divided area N is deviated from the timing of the rotation reference signal for every revolution, it is decided that writing of the information on division and positioning fails, and division is made again after erasure without moving the magnetic head 11 to a next track.

Although this embodiment relates to the method of attaching the detection ring 16 including the index mark 18, a reflection area for Doppler pulses may be previously formed during production of the hard disk and used in place of the detection ring 16, a detection ring portion including the index mark 18 may be previously formed, or the index mark may be attached after only the detection ring 16 is formed.

The size of the index mark 18 will be described below. FIGS. 12(A) through 12 (C) are drawings illustrating the size of the index mark to be written on the measurement object when the index mark is formed thereon by index mark forming means in this embodiment.

In FIGS. 12(A) through 12(C), reference numeral 18 denotes the index mark, and reference numerals 114a and 114b each denote a stop of a laser beam applied to the measurement object. The index mark 18 is smaller than the stops 114a and 114b of beams which are emitted from light source means and cross each other.

FIG. 12(A) illustrates the index mark 18 which is long in the direction perpendicular to the moving direction, FIG. 12(B) illustrates the index mark 18 which is long in the moving direction, and FIG. 12(C) illustrates the round index mark 18. The index mark to be written has a diffusion reflectance which is different from that of the measurement object, i.e., lower or higher than that of the measurement object.

Description will be made of the method of obtaining the Doppler signal pulses and index signal in this embodiment.

Figure 13:
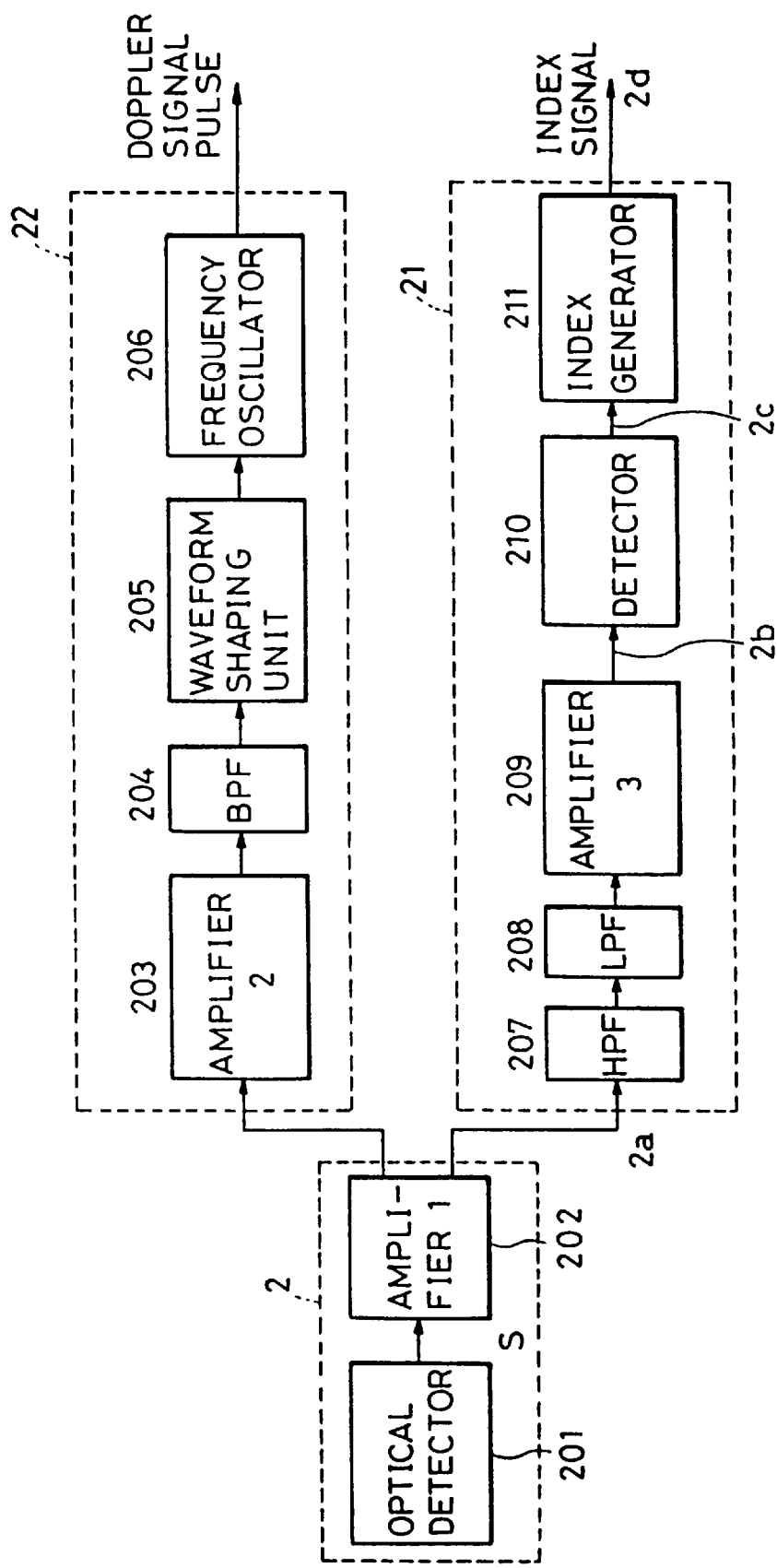
FIG. 13 is a block diagram illustrating a principal portion of a portion for detecting a Doppler signal and an index signal in the seventh embodiment.

In FIG. 13, reference numeral 2 denotes an optical head; reference numeral 22, a Doppler signal processing circuit; and reference numeral 21, an index signal processing circuit. Reference numeral 201 denotes an optical detector for detecting both the light which is subjected to Doppler shift and scattered from the measurement object (rotating object) irradiated with a beam for speed measurement and the light scattered from the index mark to output the detection signal as an output signal S. Reference numeral 202 denotes a first amplifier for amplifying the output signal S from the optical detector 201. The first amplifier 202 outputs a signal including the Doppler signal and index signal and corresponding to the quantity of light diffused and reflected from the measurement object.

Reference numeral 203 denotes a second amplifier for amplifying the Doppler signal output from the first amplifier 202 to a constant level. Reference numeral 204 denotes a band pass filter for removing noise from the Doppler signal from the second amplifier 203. Reference numeral 205 denotes a waveform shaping unit for making the Doppler signal output from the band pass filter 204 binary. Reference numeral 206 denotes a frequency oscillator for outputting the binary Doppler signal output from the waveform shaping unit 205 as a continuous signal.

Reference numeral 207 denotes a high-pass filter (HPF) for removing the signal variation caused by the surface property of the measurement object from the signal corresponding to the quantity of diffused reflected light including the index signal output from the first amplifier 202. Reference numeral 208 denotes a low-pass filter (LPF) for removing the Doppler signal and high-frequency noise from the signal output from the high-pass filter 207. Reference numeral 209 denotes a third amplifier for amplifying the index signal output from the low-pass filter 208. Reference numeral 210 denotes a detector for detecting a signal corresponding to the index mark from the signal output from the third amplifier 209 to output an index mark detection signal.

Reference numeral 211 denotes an index generator for outputting an index signal having a constant width based on the index mark detection signal output from the detector 210.

The index signal processing circuit 21 determines the cut-off frequencies of the high-pass filter 207 and low-pass filter 208 (band pass filter) based on the speed information of the rotating object to obtain a predetermined index signal from the index generator 211.

Figure 14:
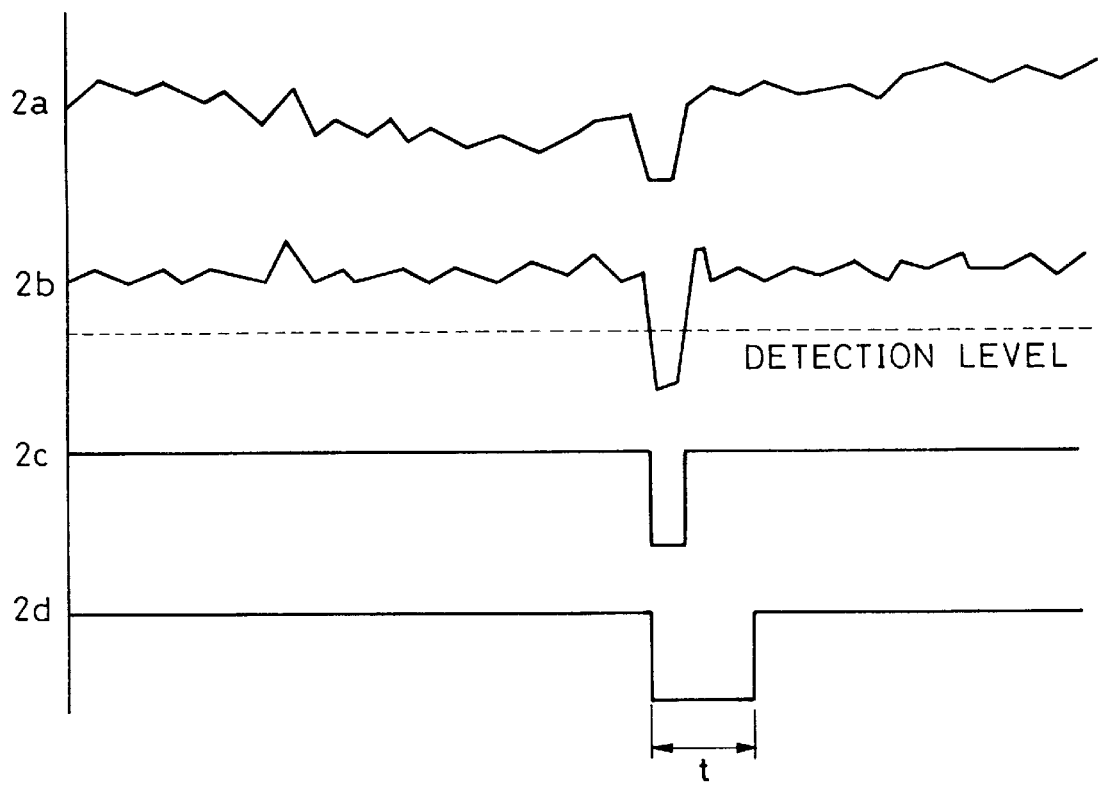
FIG. 14 is a drawing illustrating an index signal detection method in the seventh embodiment.

Description will now be made of the method of detecting and generating the index signal in this embodiment with reference to the signals shown in FIG. 14. In FIG. 13, the signal including the index signal output from the first amplifier 202 and corresponding to the quantity of diffused reflected light contains the low-frequency change caused by a change in the quality of light due to the surface property of the measurement object, as shown by a signal waveform 2a in FIG. 14.

Thus, the change in the signal caused by the surface property of the measurement object is removed by the high-pass filter 207, and the high-frequency noise caused by the Doppler signal is then removed by the low-pass filter 208. The index signal is then efficiently amplified by the third amplifier 209 to obtain such a signal as shown by a waveform 2b in FIG. 14.

Such processing facilitates setting of the signal detection level corresponding to the index mark based on the output level of the third amplifier 209 in the detector 210 for detecting the signal level, thereby preventing operating error. When the index detection signal 2c detected by the detector 210 is input, the index signal generator 211 sets the output width t of an output signal, and outputs an index signal 2 with the set output width t.

In this embodiment, the cut-off frequencies of the high-pass filter 207 and the low-pass filter 208 are set based on the speed information of the rotating object. This permits efficient amplification of the index signal by the third amplifier 209. Since the size of the index mark, the diameter of the laser beam spot, and the speed of the measurement object are known, the width of the index signal with the signal waveform 2a shown in FIG. 14 can be calculated, and the cut-off frequencies can easily be determined, for example, from the speed information obtained from the Doppler signal pulses by a signal processing unit (not shown).

Since the width of the index mark is smaller than the diameter of the two beam spots which cross each other, there is substantially no effect on the level of the Doppler signal, thereby preventing a decrease in the precision of measurement.

Figure 15:
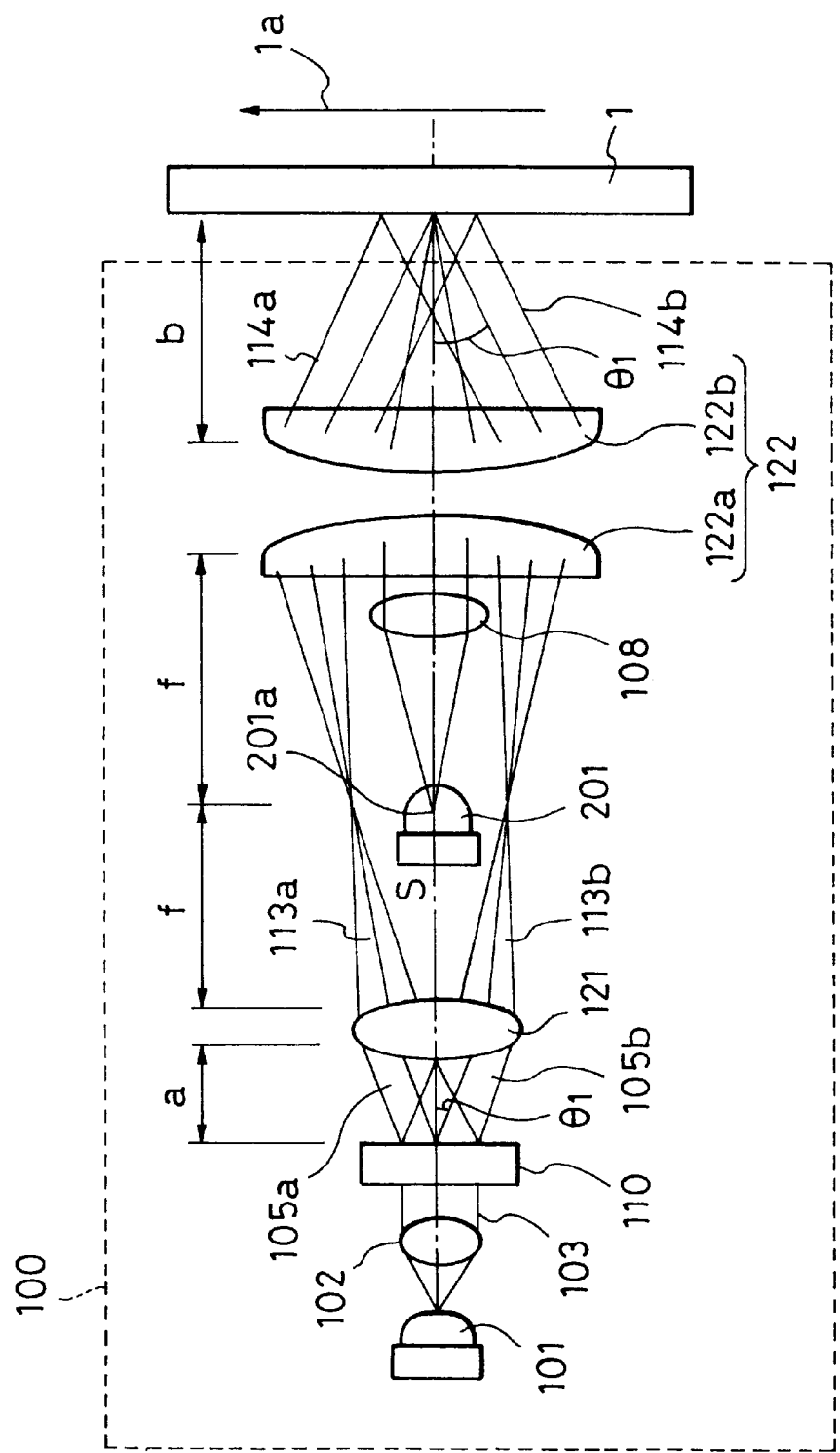
FIG. 15 is a schematic drawing illustrating a principal portion of an optical system of an optical head in the seventh embodiment.

FIG. 15 is a schematic drawing illustrating a principal portion of an optical system of the optical head 2 in accordance with this embodiment.

In FIG. 15, reference numeral 100 denotes an optical system of the optical head 2 which employs the Doppler effect. Reference numeral 101 denotes a laser diode; reference numeral 102, a collimator; reference numeral 1, a disk as a moving object; and reference numeral 110, a diffraction grating having a grating pitch d. Reference numerals 121 and 122 denote a convex lens and a lens system having a focal length f, which are arranged as shown in FIG. 15. Assuming that the distance between the diffraction grating 110 and the lens 121 is a, and the distance between the lens 122 and the rotating object is b, the distances a and b satisfy the following relation:

$$a+b=2f.$$

The laser beam emitted from the laser diode 101 having a wavelength $\lambda$ of about 0.68 $\mu$m is made into a parallel beam 103 having a diameter of 1.2 mmφ, and then enters in the direction perpendicular to the grating arrangement of the transmission type diffraction grating 110 having a grating pitch d of 3.2 μm. At this time, ±primary diffracted beams 105a and 105b are emitted at a diffraction angle $\theta_1=12°$.

When the beams 105a and 105b enter the convex lens 121 having a focal distance t (=15 mm), such beams 113a and 113b as shown in FIG. 15 are obtained. When the beams 113a and 113b enter the other convex lens 122 at a distance of 2f (=30 mm) from the convex lens 121, parallel beams 114a and 114b are obtained again to irradiate the disk 1 moving at a speed V (mm/sec) with a spot diameter of 1.2 mmφ at the same angle as the angle $\theta_1$ of diffraction from the diffraction grating 110.

The light scattered from the measurement object 1 is efficiently condensed by the convex lens 122 and a condensing lens 108 and applied to a condensing point 201a on the optical detector 201 to detect the optical signal containing the Doppler signal represented by the equation (1a) below. The speed information of the measurement object 1 is obtained through computation means (not shown) receiving the output from the Doppler signal processing circuit 21 shown in FIG. 13.

$$F=2V/d=V/1.6 \text{ (KHz)} \tag{a1}$$

wherein a=10 mm and b=20 mm, and b is made relatively long so as to increase the working distance, thereby increasing the degree of freedom of the installation of the optical system of the optical head.

If the wavelength λ of the laser beam emitted from the laser diode 101 is changed, the diffraction angle λ is also changed in accordance with d sinθ=λ, but the Doppler signal is not changed. In this apparatus, the positions of the two beam spots are also constant. Namely, the disk 1 is disposed as shown in FIG. 15, and a suitable cross state is maintained so as to keep the positions of the two beam spots constant on the disk 1 and to prevent a positional deviation between the spots, thereby obtaining the good Doppler signal and index signal.

Figure 16A:
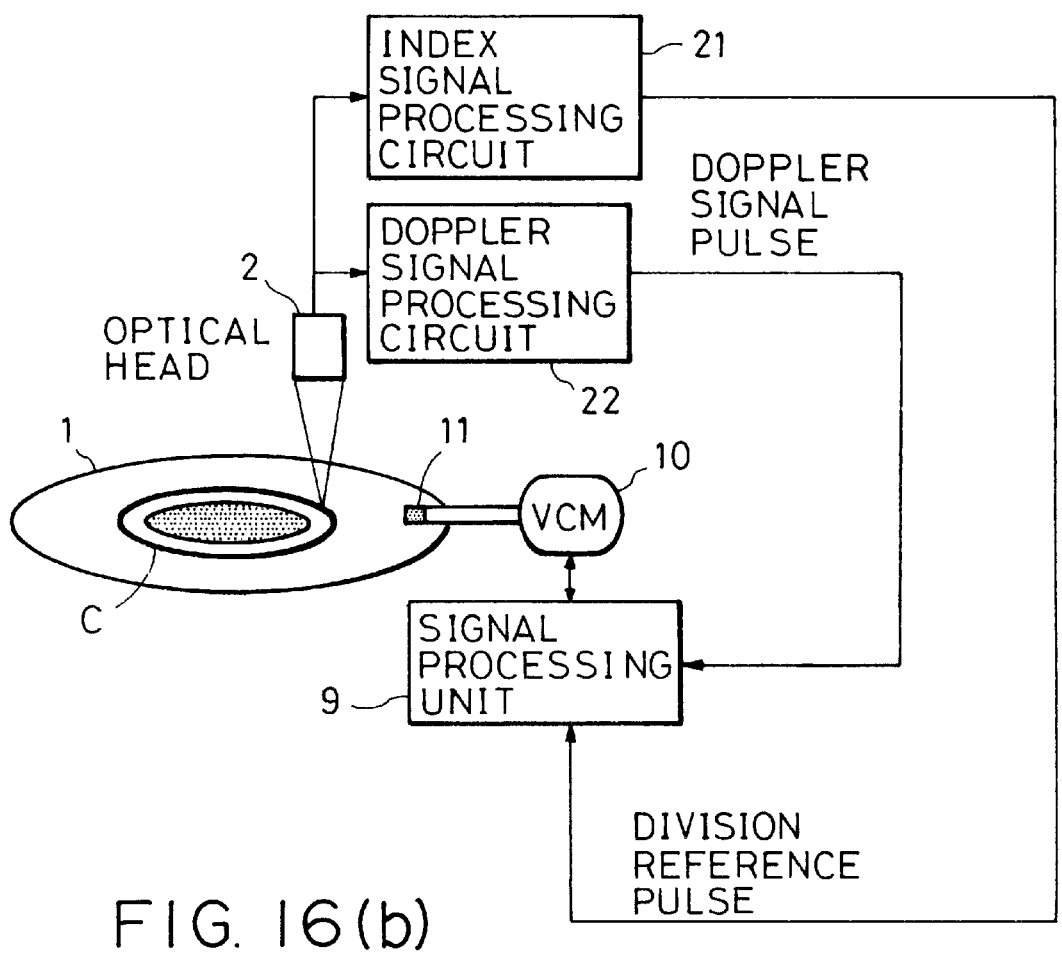
FIG. 16(A) is a block diagram illustrating a principal portion of an eighth embodiment and FIG. 16(B) shows a detection ring used in the eighth embodiment of the present invention.

FIG. 16(a) is a block diagram illustrating a principal portion of an eighth embodiment of the present invention. In this embodiment, the present invention is applied to a servo track writer of a hard disk.

The same members as those in the seventh embodiment are respectively denoted by the same reference numerals and are not described below. This embodiment is different from the seventh embodiment in that at least two index marks are provided on a diffusion reflection area.

The index signal is used as a division reference signal, and the Doppler signal pulses are used as a reference signal for writing positioning information.

Figure 16B:
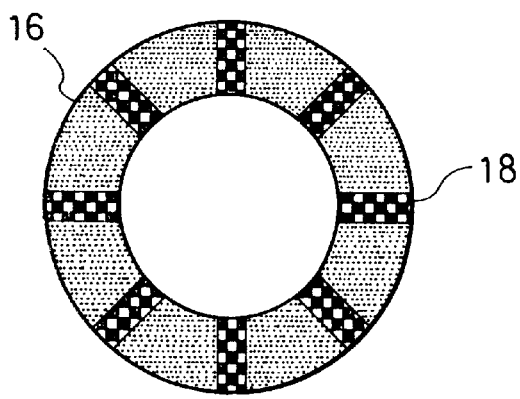

As shown in FIG. 16(b), the index marks 18 are previously provided on the detection ring 16. When a portion of the rotating object is used as the diffusion reflection area, the index marks are previously provided on the rotating object, or seals serving as the index marks are attached thereto.

If at least two index marks are previously provided with a correct positional relation therebetween, the counter means 3, the one-round pulse number memory 4, the division number data 5, the divider 6, the divided pulse number memory 7 and the comparator 8 need not be provided, thereby simplifying the circuit configuration.

The Doppler signal detection and index signal detection are the same as in the seventh embodiment.

As described above, the light scattered from the rotating object and including the Doppler signal and the index signal is detected by an optical detector for detecting the Doppler signal, and the signal output from the detector is processed by the signal processing circuit having an appropriate configuration to obtain both the Doppler signal and the index signal. It is thus possible to detect the rotation information of the rotating object with high precision by a simple construction and to achieve a device for generating a reference signal for non-contact writing of positional information with high precision without influences of variations in the rotational speed.

When such an apparatus is used, the formation of the index mark on the measurement object has no effect on the Doppler signal. There is also the effect that the index signal can be correctly obtained even if the speed information of the measurement object is changed.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for detecting rotational angle information of a rotating object having a rotational axis and a perimeter, said apparatus comprising:

an optical head for (i) applying a beam to the rotating object interior of the perimeter at a predetermined radial distance from the rotational axis, (ii) detecting light scattered from the object and (iii) outputting a detection signal including Doppler pulses having a frequency proportional to a rotational velocity of the rotating object; and a signal processing system for (i) receiving the detection signal output from said optical head and (ii) detecting rotational angle information of the rotating object by processing the Doppler pulses contained in the detection signal output from said optical head.

2. An apparatus according to claim 1, wherein said signal processing system divides the Doppler pulses for one rotation of said rotating object and divides the angle of said rotating object into a plurality of areas in the rotation direction thereof by using the number of Doppler pulses per divided area.

3. An apparatus according to claim 1, further comprising decision means for deciding the start and end of counting of pulses so that said signal processing system divides the pulses counted from the start to the end of counting by a predetermined division number, and divides the angle of said rotating object into a plurality of areas in the rotation direction thereof by using the Doppler pulses per divided area.

4. An apparatus according to claim 3, wherein said decision means comprises detection means for detecting a reference position mark provided on said rotating object, and means for deciding the start and end of counting of pulses based on the detection by said detection means.

5. An apparatus according to claim 4, wherein said detection means detects said reference mark using the light scattered therefrom.

6. An apparatus according to claim 3, wherein said decision means decides the start and end of counting of pulses based on the detection signal output from said optical head.

7. An apparatus for writing angular information on a rotating object, said apparatus comprising:

an optical head for (i) applying a beam to the rotating object, (ii) detecting light scattered from the rotating object and (iii) outputting a detection signal including a Doppler signal that includes information regarding a rotational velocity of the rotating object;

a counter for counting pulses generated from the Doppler signal contained in the detection signal output from said optical head;

a divider for determining a number of the pulses corresponding to a partial revolution of the rotating object;

a signal processing system for receiving the detection signal output from said optical head and detecting the angular information of the rotating object based on a comparison of the pulses counted by said counter to the number determined by said divider; and a writing head for writing the angular information on said rotating object based on detection by said signal processing system.

8. An apparatus according to claim 7, wherein said signal processing system divides the Doppler pulses for one rotation of said rotating object by a predetermined division number, and executes writing of the division information indicating that the angle of said rotating object is divided into a plurality of areas in the rotational direction thereof, by said writing head using the Doppler pulses per divided area.

9. A rotating object to which a beam is applied by an optical head, light scattered from which is detected by the optical head, and rotational angle information of which is indicated by Doppler pulses contained in a detection signal output by the optical head based on the detection of light scattered therefrom, said rotating object comprising:

a rotational axis; and a diffusion reflection area on a ring provided with a center at the rotational axis so that the beam applied from the optical head is reflectively scattered by the diffusion reflection area, to effect a Doppler shift proportional to a rotational velocity of the diffusion reflection area on the light scattered therefrom and the scattered light from the diffusion reflection area is detected by the optical head, wherein the Doppler pulses can be obtained in the detection signal by detecting the diffused light output by the optical head.

10. A rotating object according to claim 9, further comprising an information writing unit for writing the detected rotational angle information.

11. An apparatus for detecting displacement information, said apparatus comprising:

an optical head for (i) applying a beam to an object which includes a diffusion reflection area which includes a reference area, (ii) detecting light scattered from the diffusion reflection area of said object and (iii) outputting a detection signal indicative of a Doppler shift in the detected light relative to the beam;

a first detection unit for detecting speed information based on the detection signal output from said optical head; and a second detection unit for detecting the reference area on the object based on intensity deviations of the scattered light detected by said optical head.

12. An apparatus according to claim 11, wherein said first detection unit has a gain adjustment circuit for correcting a change in the quantity of the scattered light output from said optical head, and said second detection unit detects the reference area on said object by partially employing the function of said gain adjustment circuit.

13. An apparatus for detecting displacement information, said apparatus comprising:

an optical head for (i) applying a beam to an object with a reflectance area which includes an index area, (ii) detecting light scattered from the reflectance area of the object, and (iii) outputting a detection signal indicative of a Doppler shift in the detected light relative to the beam;

a Doppler signal processing circuit for processing the detection signal output from said optical head to determine speed information; and an index signal processing circuit for detecting, from intensity deviations in the detection signal output from said optical head, the index area on the object.

14. An apparatus according to claim 13, wherein said index signal processing circuit executes detection of the index area based on a level of the detection signal.

15. An apparatus for detecting displacement information, said apparatus comprising:

an optical head for (i) applying a beam to an object with a reflectance area which includes an index area, (ii) detecting light scattered from the reflectance area of the object, and (iii) outputting a detection signal indicative of a Doppler shift in the detected light relative to the beam;

a Doppler signal processing circuit for processing the detection signal output from said optical head to determine speed information; and an index signal processing circuit for detecting, from intensity deviations in the detection signal output from said optical head, the index area on the object, wherein said index signal processing circuit has a frequency filter, a cut-off frequency of said frequency filter being variable based on speed information of said object.

16. A method of detecting displacement information, comprising:

applying a beam to an object having a reflectance area which includes an index area;

detecting light scattered from the reflectance area of the object;

generating a detection signal at least partially based on a Doppler shift in the detected light relative to the beam;

processing the detection signal to output a Doppler signal indicative of speed information; and processing intensity deviations in the detection signal to output an index signal indicative of the index area on the object.

17. An apparatus for generating a reference signal for writing positioning information on a rotating object, said apparatus comprising:

an optical head for (i) applying a beam to the rotating object which includes a reflectance area with an index area, (ii) detecting light scattered from the reflectance area of the rotating object, and (iii) outputting a detection signal indicative of a Doppler shift in the detected light relative to the beam;

a Doppler signal processing circuit for processing the detection signal output from said optical head to generate Doppler signal pulses having a frequency proportional to a rotational velocity of the rotating object;

an index signal processing circuit for processing the detection signal output from said optical head to generate an index signal based on detection of the index area on the rotating object; and means for generating a reference signal for recording positioning information on the rotating object based on the Doppler signal pulses and the index signal.

18. An apparatus for writing angular information on a rotating object, said apparatus comprising:

an optical head for (i) applying a beam to the rotating object which includes a reflectance area with an index area, (ii) detecting light scattered from the reflectance area of the rotating object, and (iii) outputting a detection signal indicative of a Doppler shift in the detected light relative to the beam;

a Doppler signal processing circuit for processing the detection signal output from said optical head to generate Doppler signal pulses having a frequency proportional to a rotational velocity of the rotating object;

an index signal processing circuit for processing the detection signal output from said optical head to generate an index signal based on detection of the index area on the rotating object; and recording means for recording rotational angle information of the rotating object thereon based on the Doppler signal pulses and the index signal.

19. An apparatus for writing angular information on a rotating object, said apparatus comprising:

an optical head for (i) applying a beam to the rotating object which includes a reflectance area with an index area, (ii) detecting light scattered from the reflectance area of the rotating object, and (iii) outputting a detection signal indicative of a Doppler shift in the detected light relative to the beam;

a Doppler signal processing circuit for processing the detection signal output from said optical head to generate Doppler signal pulses having a frequency proportional to a rotational velocity of the rotating object;

an index signal processing circuit for processing the detection signal output from said optical head to generate an index signal based on detection of the index area on the rotating object; and recording means for recording rotational angle information of the rotating object thereon based on the Doppler signal pulses and the index signal, wherein said Doppler signal processing circuit divides the Doppler pulses for one rotation of said rotating object by a predetermined division number, and divides the angle of said rotating object into a plurality of areas in the rotational direction thereof by using the Doppler pulses per divided area.

20. An apparatus according to claim 19, wherein said recording means records division information of the areas on said rotating object based on division information of said plurality of divided areas in the rotation angle direction, which is obtained from said Doppler signal processing circuit.

21. An apparatus for detecting displacement information, said apparatus comprising:

an optical head for (i) applying a beam to an object with an index area, (ii) detecting light scattered from said object, and (iii) outputting a detection signal indicative of a Doppler shift in the detected light relative to the beam;

a Doppler signal processing circuit for processing the detection signal output from said optical head to determine speed information; and an index signal processing circuit for detecting, from intensity deviations in the detection signal output from said optical head, the index area on said object, wherein said index processing circuit includes a frequency filter, and a cut-off frequency of said frequency filter being variable based on speed information of said object.

* * * * *

UNITED STATES PATENT AND TRADEMARK OFFICE
CERTIFICATE OF CORRECTION

PATENT NO. : 6,057,976
DATED : May 2, 2000
INVENTOR(S) : Yasuhiko Ishida, et al.

It is certified that error appears in the above-identified patent and that said Letters Patent is hereby corrected as shown below:

Column 9,
Line 65, "A." should read -- $\underline{d}$. --.

Column 11,
Line 65, "m=one-revolution pulse number - (NxN)" should read -- m=one revolution pulse number - (nxN), --.

Column 12,
Line 5, "3003 ≈30=100.1" should read -- 3003 ÷ 30=100.1 --.
Line 62, "of" should read -- at --.

Column 15,
Line 7, "t (=15 mm)," should read -- f (=15 mm), --

Signed and Sealed this

Fourth Day of September, 2001

Attest:

NICHOLAS P. GODICI
*Acting Director of the United States Patent and Trademark Office*

*Attesting Officer*